United States Patent [19]
Tsutsumi

[11] Patent Number: 6,058,269
[45] Date of Patent: May 2, 2000

[54] OSCILLATION ISOLATING ATTACHMENT LENS SYSTEM

[75] Inventor: Katsuhisa Tsutsumi, Saitama, Japan

[73] Assignee: Fuji Photo Optical Co., Ltd., Saitama, Japan

[21] Appl. No.: 09/266,779

[22] Filed: Mar. 12, 1999

[30] Foreign Application Priority Data

Mar. 12, 1998 [JP] Japan .................................. 10-080269

[51] Int. Cl.$^7$ .......................... G03B 17/00; G02B 27/64; G02B 15/10
[52] U.S. Cl. .............................. 396/55; 396/71; 348/208; 359/557; 359/675
[58] Field of Search .................................. 396/55, 52, 71; 348/208; 359/554, 557, 675, 674, 672

[56] References Cited

U.S. PATENT DOCUMENTS 5,655,157  8/1997  Enomoto .................................. 396/55

FOREIGN PATENT DOCUMENTS 63-201624  8/1988  Japan .
6-189181  7/1994  Japan .

*Primary Examiner*—W. B. Perkey
*Attorney, Agent, or Firm*—Young & Thompson

[57] ABSTRACT

An attachment lens optical system equipped with an oscillation isolating feature for extending a focal length of a camera lens comprises, in order from the object side, a negative power first lens group having three lens elements, a negative power second lens group having three lens elements, and a third lens group having two lens elements, at least one of the first to third lens groups being movable in a direction perpendicular to an axis of the attachment lens optical system so as to cancel an image oscillation caused due to a shake of the imaging device.

13 Claims, 21 Drawing Sheets

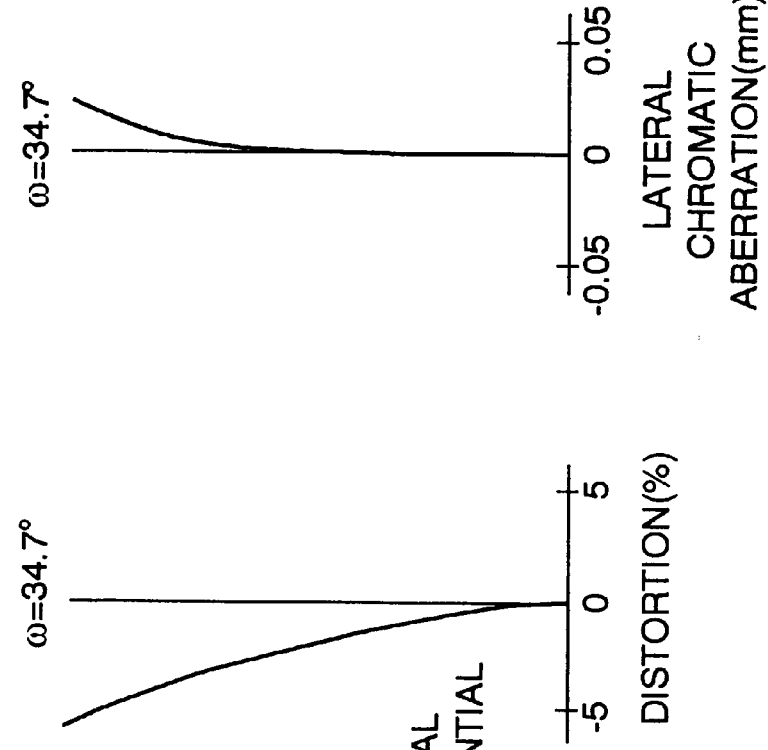
Fig. 10A
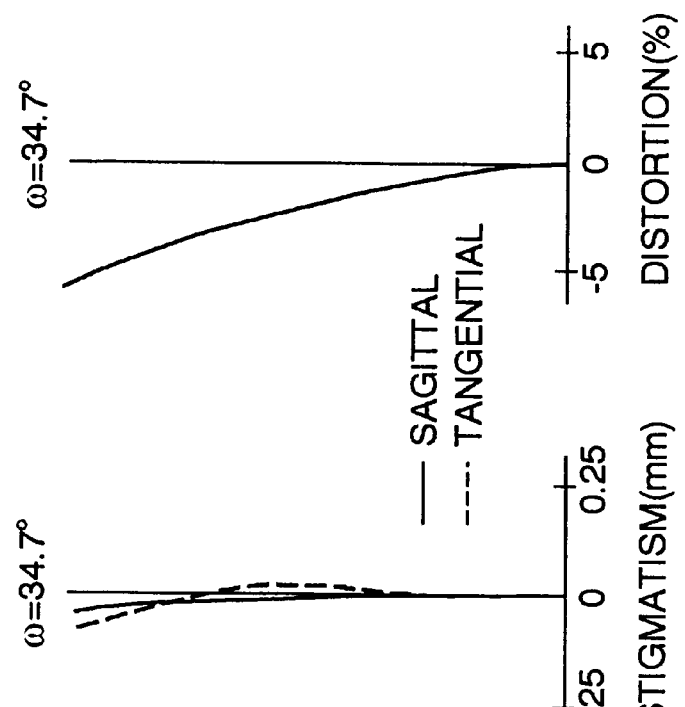
Fig. 10B
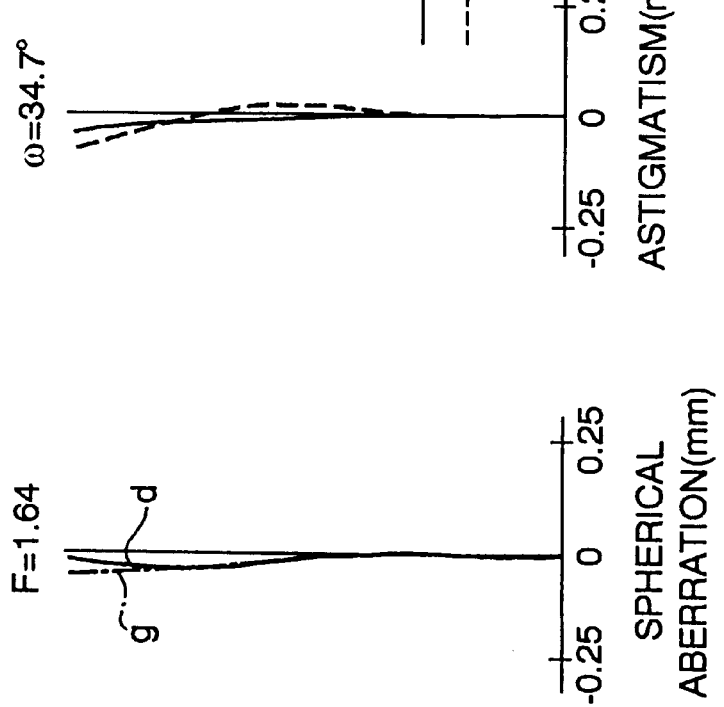
Fig. 10C
Fig. 10D

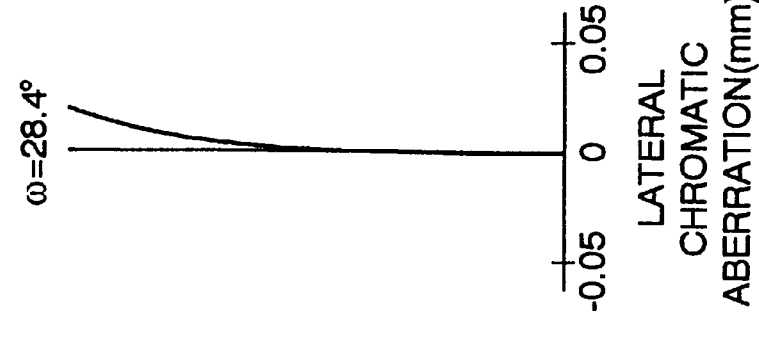
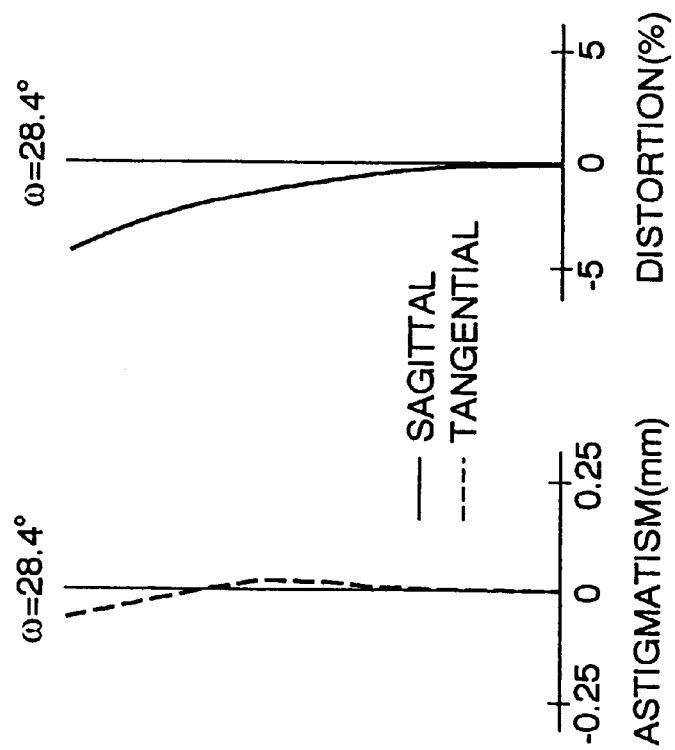
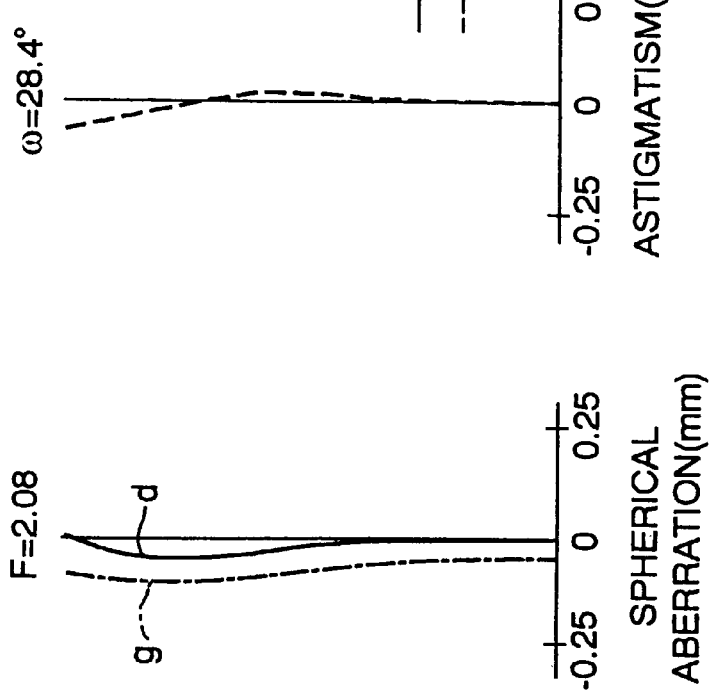

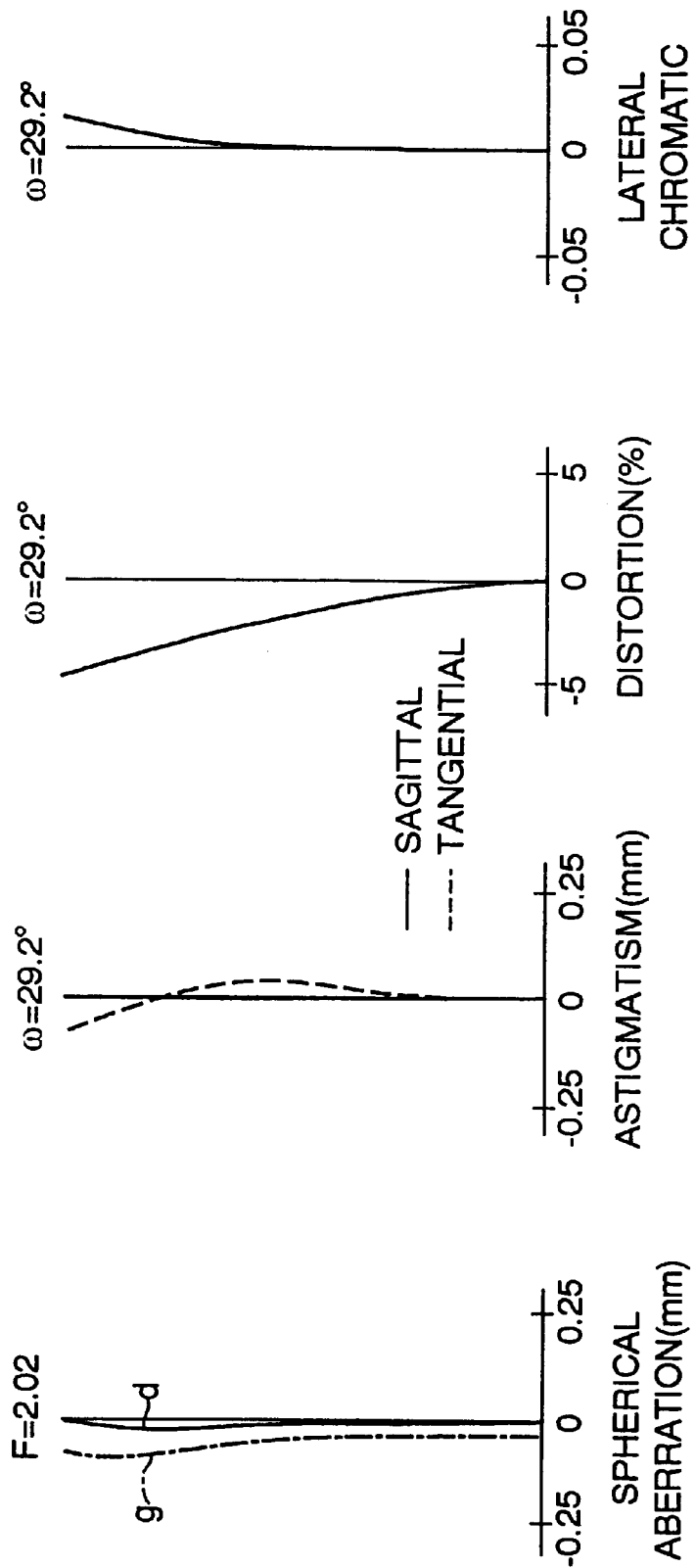

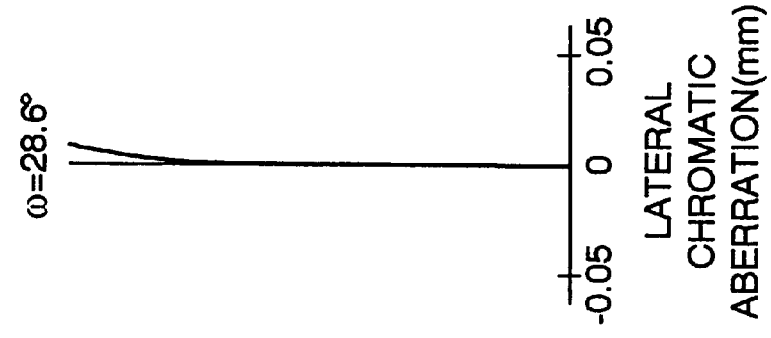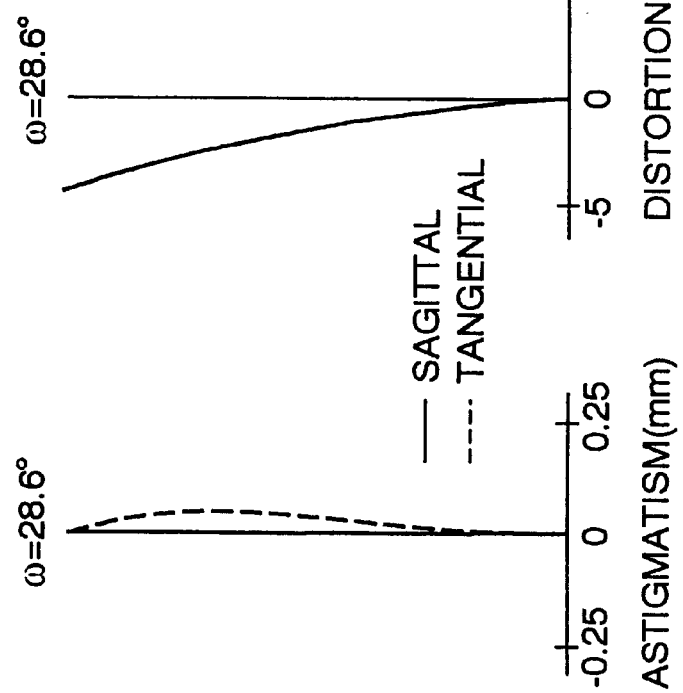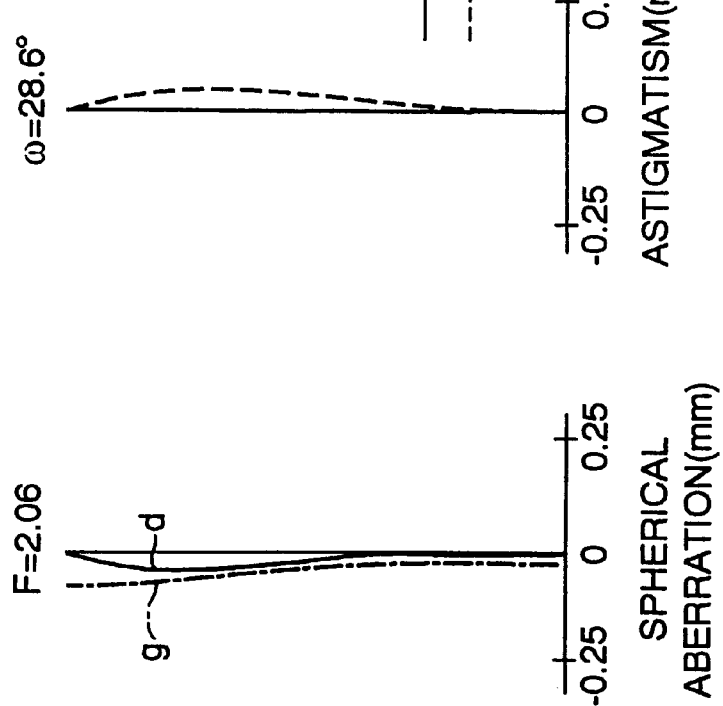

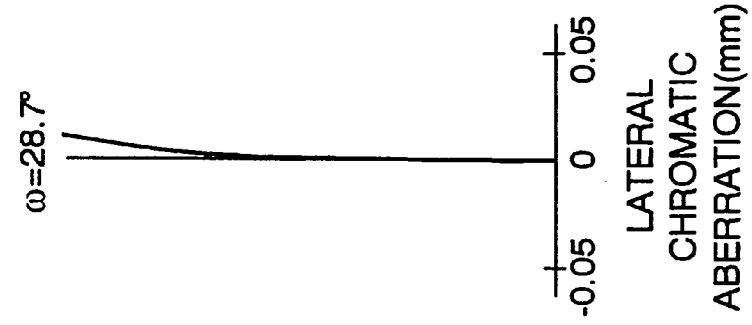
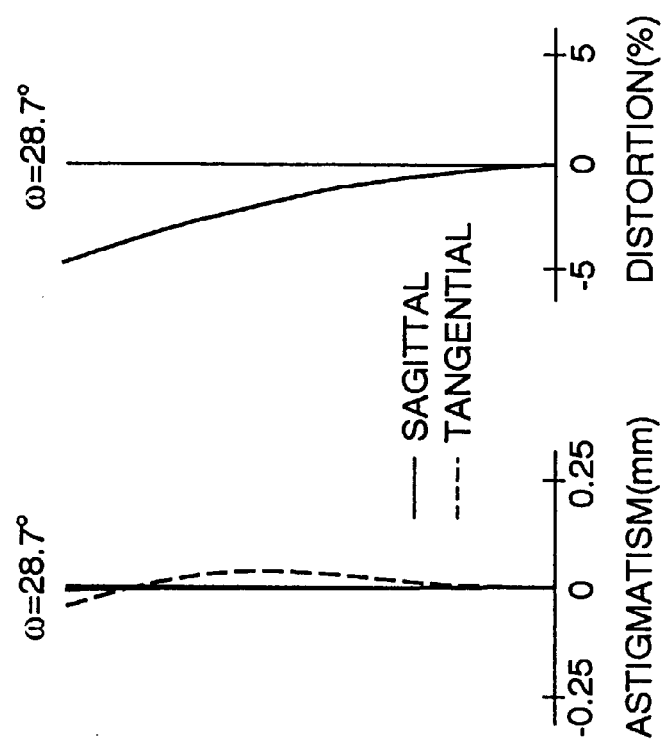
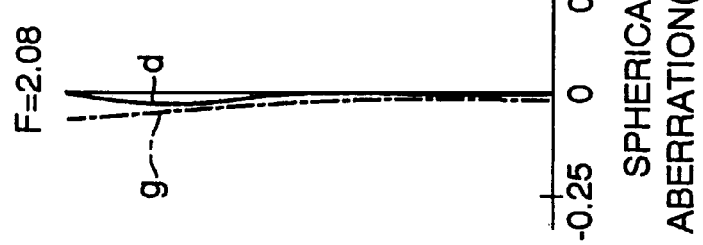

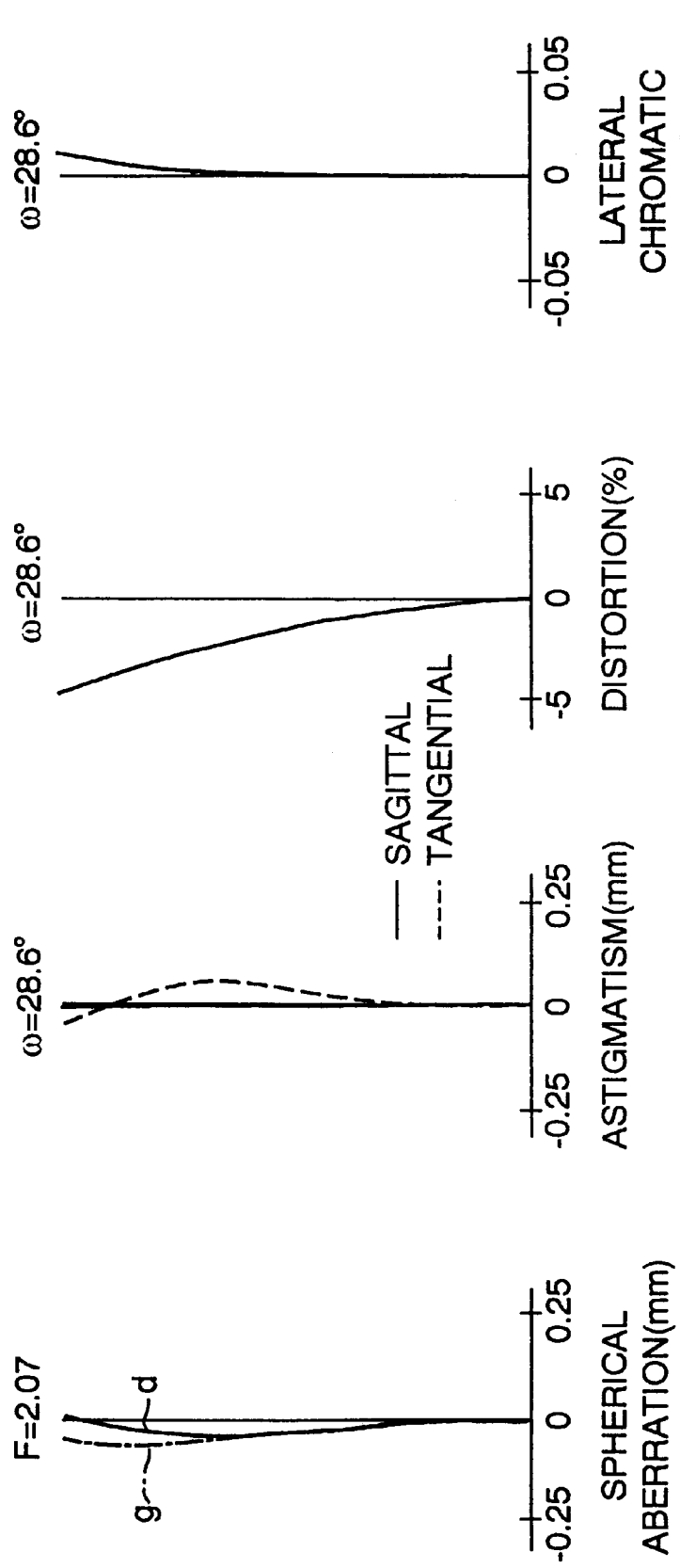

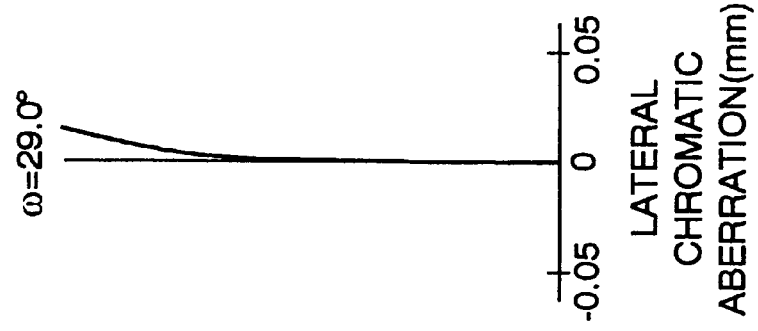
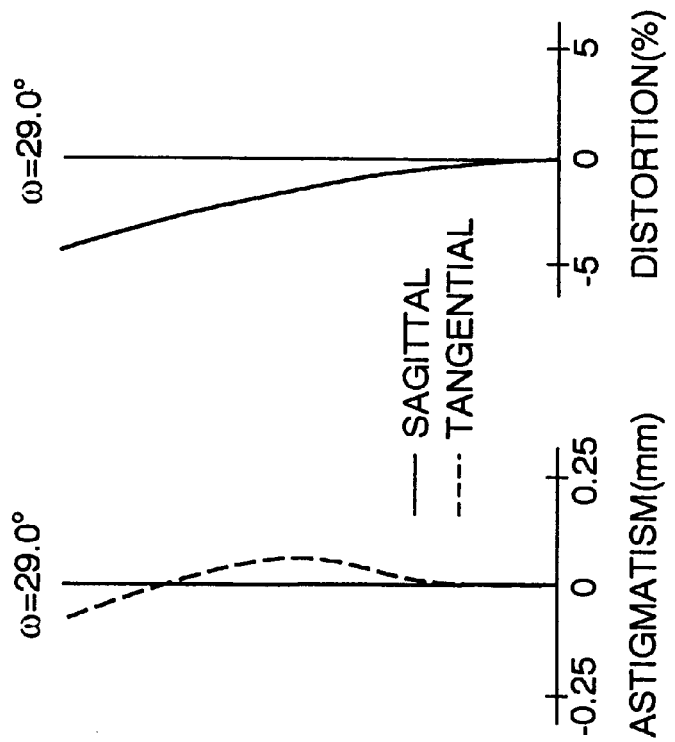
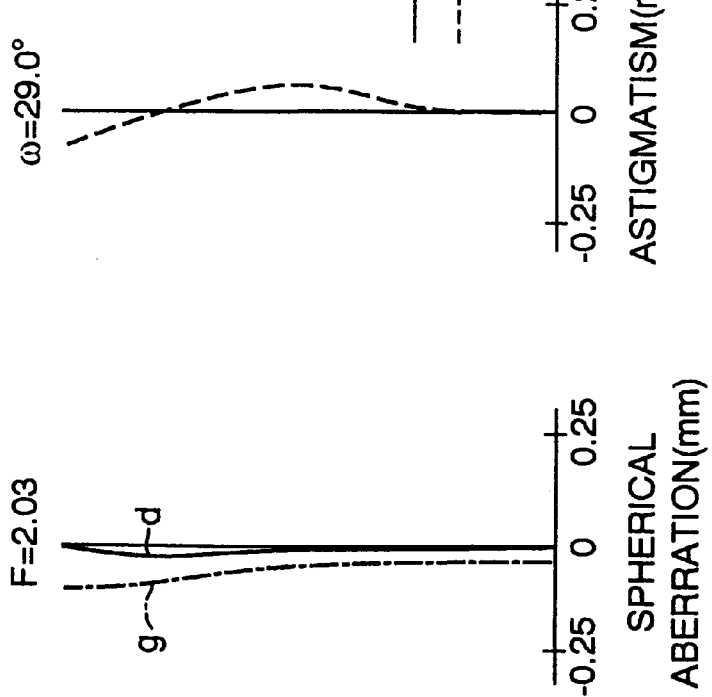

OSCILLATION ISOLATING ATTACHMENT LENS SYSTEM

BACKGROUND OF THE INVENTION

1. Field of the Invention

The invention relates to an attachment lens detachably incorporated between a main camera lens and a camera such as a television camera equipped with a color separation optical system and/or filters and a video camera equipped with a color separation optical system and/or filters which imposes restraints on optical dimensions such as a back-focal distance for extending the focal length of the main camera lens, and, more particularly, to an oscillation isolating attachment lens detachably incorporated between a main camera lens and a camera such as a television camera and a video camera which prevents or significantly reduces tremors or oscillations of an image from occurring due to camera shakes.

2. Description of Related Art

With an increased demand of high resolution for the entire area of a charge coupled device (CCD) installed as an image forming device in cameras such as a TV camera and a video camera, the camera lens is required to have optical performance to form the whole area of image with a high and uniform resolution. Further, there have been put to practical use various types of attachment lenses which extend the focal length of a camera lens with which the attachment lens is used together without shifting the focal point of the camera lens. One of such attachment lenses such as known from, for example, Japanese Unexamined Patent Publication No. 63-201624 is equipped with a damping mechanism for preventing tremors of an image from occurring due to camera shakes. This attachment lens is of a type of extender having a magnification greater than approximately 1.3 which moves the whole lens groups or at least one of the lend groups in a direction perpendicular to an axis of the lens so as to cancel a tremor or oscillation of an image due to a camera shake. Japanese Unexamined Patent Publication No. 6-189181 teaches a concept that a damping device is incorporated in an attachment lens between a negative power front lens group and a positive power rear lens group and, however, does not in any way describe details of the damping device.

Typically, photographing is made in multifarious conditions and circumstances, For example, there are great demands for taking a photograph in subdued lighting or with a reduced depth of field with an effect of improving image quality. In such a case, it is essential to used a taking lens having a large aperture ratio. TV camera lenses and video camera lenses which are required to have a relatively high resolution power are essential to have a long back-focal distance because TV cameras and video cameras incorporate a color separation optical system and/or a filter assembly in front of an imaging device therein. Such a TV camera lens or a video camera lens is generally required to have a relatively long distance to an exit pupil. If the exit pupil is at a short distance, there occurs color shading due to a difference in incident angles of principal light rays incident upon upper and lower margins of a dichroic mirror of the color separation optical assembly, which is a matter of great concern for lenses having large aperture ratios. Therefore, an oscillation isolating attachment lens of this type detachably incorporated between a main camera lens and a TV camera or a video camera is essential to have a long distance to the exit pupil as well as a long back-focal length.

The extender lens described in Japanese Unexamined Patent Publication No. 63-201624 has a relatively large magnification, and hence the whole optical system of the extender lens unavoidably has a large F-number, i.e. a low speed. If the extender lens has a magnification between approximately 1.1 and 1.3, the optical system is difficult to have a high negative power and, in consequence, impossible to meet the requirement of having a long back-focal length and a long distance to the exit pupil.

SUMMARY OF THE INVENTION

It is an object of the invention to provide an attachment lens for use with a camera lens of a TV camera or a video camera equipped with a color separation optical system which has an oscillation isolating feature.

It is another object of the invention to provide an attachment lens having an oscillation isolating feature for use with a camera lens of a TV camera or a video camera equipped with a color separation optical system which keeps high resolution power of the camera lens without causing a change in aberrations.

It is another object of the invention to provide an attachment lens having an oscillation isolating feature for use with a camera lens of a TV camera or a video camera equipped with a color separation optical system which provides a long back-focal distance and a long distance to an exit pupil without being accompanied by aggravation of lens speed.

The foregoing objects of the invention are accomplished by an attachment lens optical system equipped with an oscillation isolating feature which works to extend the overall focal length of a camera lens when incorporated between the camera lens and an imaging device, the oscillation isolating attachment lens optical system comprising, in order from the object side, a positive power lens group including a single lens element such as a biconcave lens element and a negative power meniscus lens element having a convex object side surface, a cemented doublet consisting of a biconcave lens element and a biconvex lens element, and a biconvex lens element, and a lens group including at least one biconcave lens element. At lease one of the lens groups or at least one of the lens elements is movable in a direction perpendicular to the optical axis of the oscillation isolating attachment lens optical system.

Specifically, the oscillation isolating attachment lens optical system comprises, in order from the object side, a negative power first lens group, a positive power second lens group and a third lens group and has a magnification $\beta$ satisfying the following condition:

$$1.1 \leq \beta < 1.3$$

The oscillation isolating attachment lens optical system may comprise the first lens group which includes, in order from the object side, a first lens element such as a biconcave lens element and a negative power meniscus lens element having a convex object side surface and a cemented doublet consisting of a biconcave second lens element and a biconvex third lens element, the second lens group which includes at least one biconvex lens element, and the third lens group which includes at least one biconcave lens element. In the case where the third lens group has a negative power, the oscillation isolating attachment lens optical system desirably satisfies the following condition:

$$0.1 \leq |f_1/f_3| \leq 0.7$$

where $f_1$ and $f_3$ are the overall focal lengths of the first lens element of the first lens group and the fourth lens group, respectively.

On the other hand, in the case where the third lens group has a positive power, the oscillation isolating attachment lens optical system desirably satisfies the following condition:

$$0.1 \leq |f_1/f_3| \leq 0.5$$

Further, the oscillation isolating attachment lens optical system desirably satisfies the following conditions:

$$1.8 < N_1$$

$$1.8 < N_2$$

$$v_3 < v_2$$

$$v_{3bcc} < 30$$

where $N_1$ and $N_2$ are the indices of refraction of the first and second lens elements of the first lens group, respectively, and $v_2$, $v_3$ and $v_{3bcc}$ are the Abbe numbers of the second and third lens elements of the first lens group and the biconcave lens element of the third lens group, respectively.

BRIEF DESCRIPTION OF THE DRAWINGS

The present invention will be clearly understood from the following description directed to preferred embodiments thereof when read in conjunction with the following drawings in which:

FIGS. 10A, 10B, 10C and 10D are diagrams showing spherical aberrations, astigmatism, distortion and lateral chromatic aberration, respectively, of the television camera lens without the oscillation isolating attachment lens which is at a wide-angle end or the shortest setting;

FIGS. 11A, 11B, 11C and 11D are diagrams showing spherical aberrations, astigmatism, distortion and lateral chromatic aberration, respectively, of the television camera lens including the oscillation isolating attachment lens of FIG. 2;

FIGS. 13A, 13B, 14C and 14D are diagrams showing spherical aberrations, astigmatism, distortion and lateral chromatic aberration, respectively, of the television camera lens including the oscillation isolating attachment lens of FIG. 4;

FIGS. 14A, 14B, 14C and 14D are diagrams showing spherical aberrations, astigmatism, distortion and lateral chromatic aberration, respectively, of the television camera lens including the oscillation isolating attachment lens of FIG. 5;

FIGS. 15A, 15B, 15C and 15D are diagrams showing spherical aberrations, astigmatism, distortion and lateral chromatic aberration, respectively, of the television camera lens including the oscillation isolating attachment lens of FIG. 6;

FIGS. 16A, 16B, 16C and 16D are diagrams showing spherical aberrations, astigmatism, distortion and lateral chromatic aberration, respectively, of the television camera lens including the oscillation isolating attachment lens of FIG. 7;

FIGS. 17A, 17B, 17C and 17D are diagrams showing spherical aberrations, astigmatism, distortion and lateral chromatic aberration, respectively, of the television camera lens including the oscillation isolating attachment lens of FIG. 8;

FIGS. 18A, 18B, 18C and 18D are diagrams showing spherical aberrations, astigmatism, distortion and lateral chromatic aberration, respectively, of the television camera lens including the oscillation isolating attachment lens of FIG. 9;

DETAILED DESCRIPTION OF THE EMBODIMENTS

In the following description, prescription tables are provided to set forth lenses with parameters. In the prescription tables, the reference L followed by an Arabic numeral indicates the lens element progressively from the object end to the image end of the lens. The reference radius numbers R are the progressive lens surface radii. Positive surface radii are struck from the right of the lens surface on the optical axis X. Negative surface radii are struck from the left of the lens surface on the optical axis X. D is the axial distance between adjacent surfaces, i.e. the axial thickness of the lens element or the axial air space between adjacent lens elements. N is the index of refraction of the lens element for e-line. v is the dispersion of the lens element as measured by the Abbe number.

Figure 1:
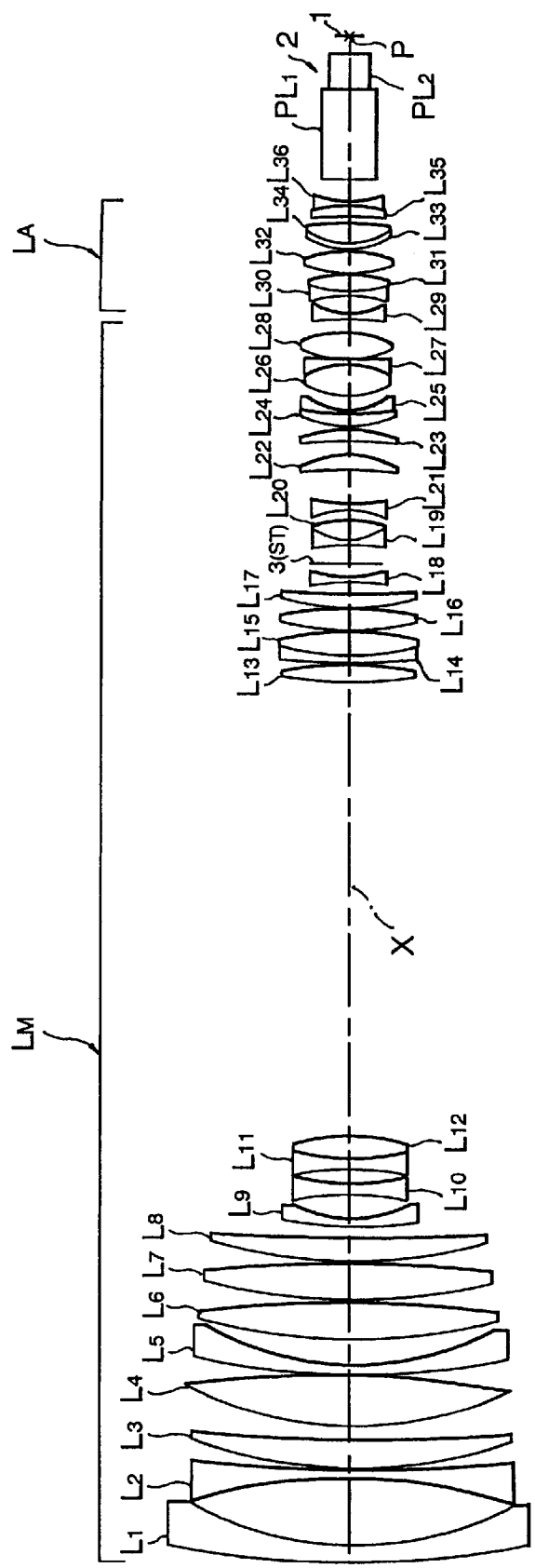
FIG. 1 is a schematic side view of a television lens system including an oscillation isolating attachment lens of the invention.
Figure 19:
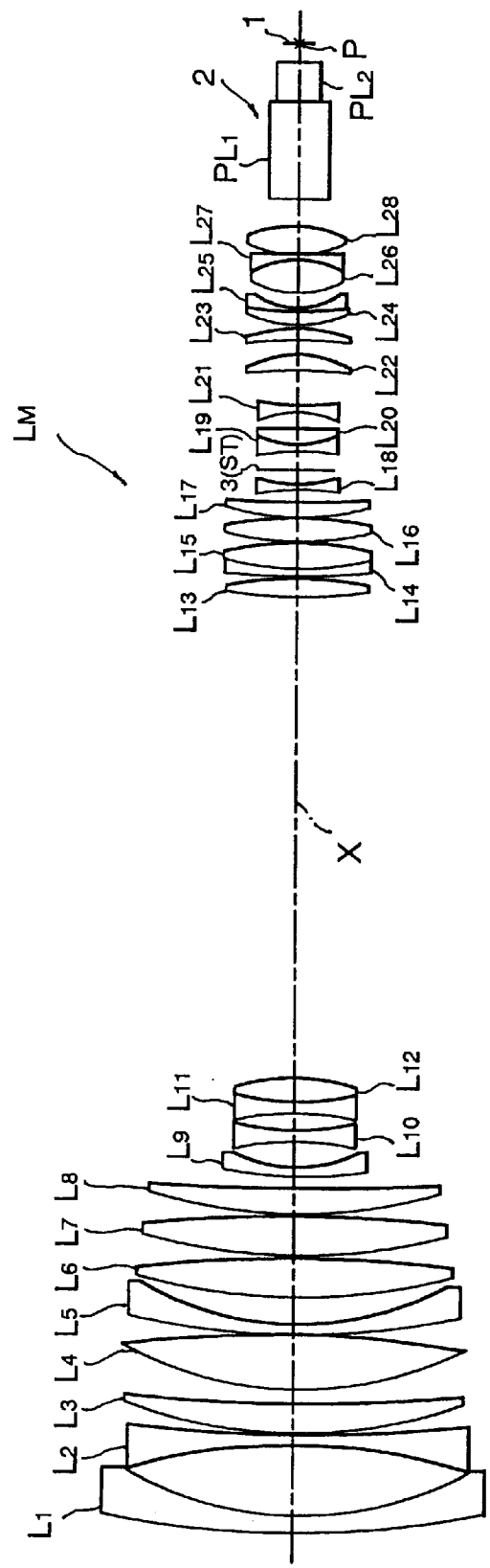
FIG. 19 is a schematic side view of a television camera lens shown in FIG. 1.
Figure 20:
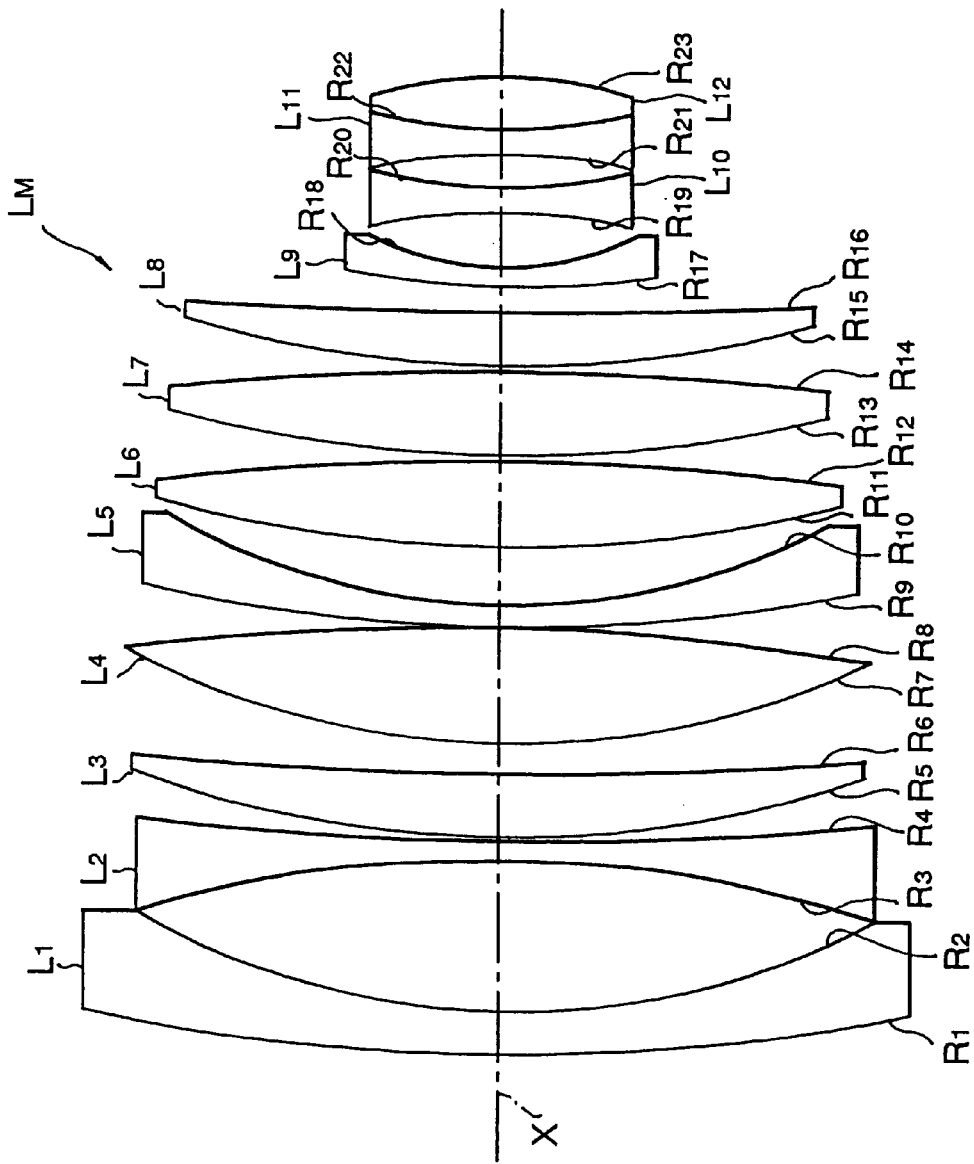
FIG. 20 is a schematic side view of a part of the television camera lens.
Figure 21:
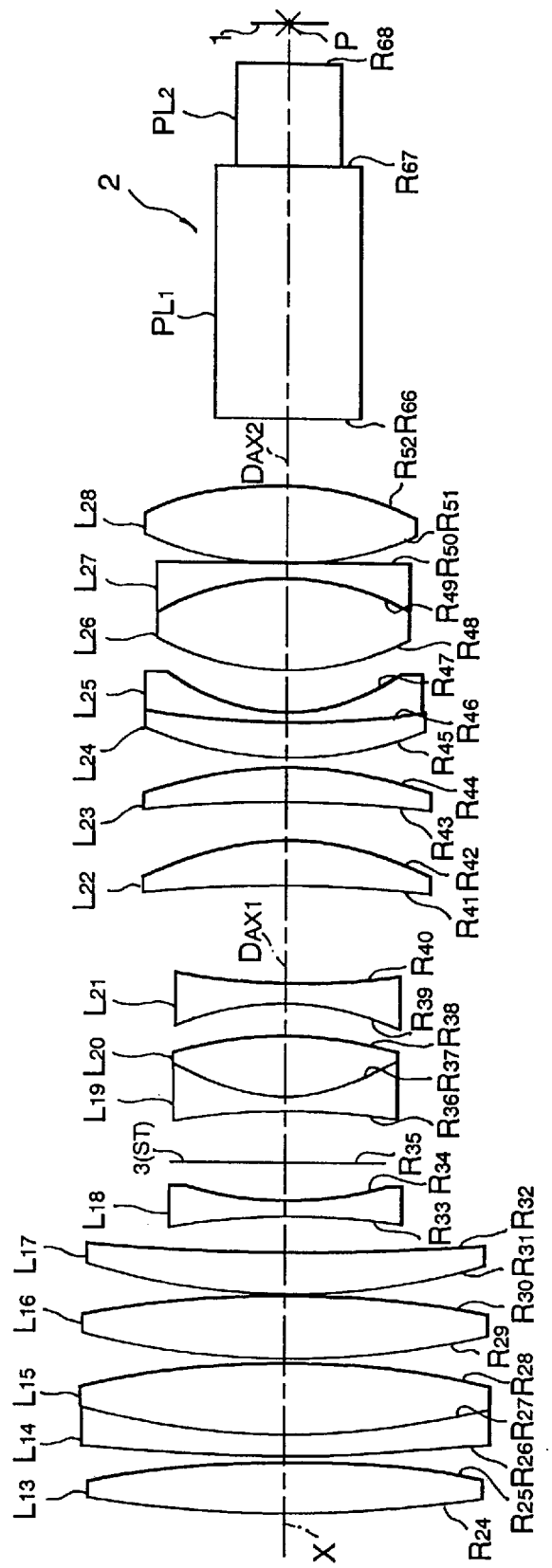
FIG. 21 is a schematic side view of the remaining part of the television camera lens.

Referring to the drawings in detail, and in particular to FIG. 1 which shows a television lens system including a main lens LM and an attachment lens LA equipped with an oscillation isolating feature in accordance with an embodiment of the invention, the television lens system is attached to a mount of a television camera (not shown) which is provided with, for example, a color separation optical system 2. The main lens $L_M$ is a zoom lens comprising 28 lens elements $L_1$ through $L_{28}$ which are divided into a plurality of lens groups. Specified lens groups are movable relative to each other along the optical axis X to change the overall focal length f of the zoom lens between the shortest setting (wide-angle end) as shown in FIG. 19 and the longest setting (telephoto end) as shown in FIGS. 20 and 21 so as thereby to provide desired zoom ratios. Another lens group is movable along the optical axis X during focusing to focus an image of an object on a focal plane 1 at a point P on the optical axis X. The zoom lens $L_M$ incorporates a shutter 3 at a specified axial position. The zoom lens $L_M$ is substantially described in Table I.

TABLE I

| Element | Radius of Curvature (mm) | Axial Distance Between Surfaces (mm) | Nd | ν |
|---|---|---|---|---|
| $L_1$ | $R_1 = 557.674$ | | | |
| | | 4.30 | 1.777250 | 49.6 |
| | $R_2 = 112.434$ | | | |
| | | 28.00 | | |
| $L_2$ | $R_3 = -261.504$ | | | |
| | | 3.80 | 1.77250 | 49.6 |
| | $R_4 = 1511.372$ | | | |
| | | 1.00 | | |
| $L_3$ | $R_5 = 220.911$ | | | |
| | | 10.00 | 1.84665 | 23.9 |
| | $R_6 = 1851.518$ | | | |
| | | 3.50 | | |
| $L_4$ | $R_7 = 140.717$ | | | |
| | | 20.00 | 1.43875 | 94.9 |
| | $R_8 = -533.163$ | | | |
| | | 0.20 | | |
| $L_5$ | $R_9 = 327.636$ | | | |
| | | 3.70 | 1.80517 | 25.4 |
| | $R_{10} = 123.960$ | | | |
| | | 10.00 | | |
| $L_6$ | $R_{11} = 256.585$ | | | |
| | | 14.00 | 1.49700 | 81.6 |
| | $R_{12} = -327.636$ | | | |
| | | 0.20 | | |
| $L_7$ | $R_{13} = 199.332$ | | | |
| | | 13.50 | 1.49700 | 81.6 |
| | $R_{14} = -1588.801$ | | | |
| | | 0.20 | | |
| $L_8$ | $R_{15} = 178.311$ | | | |
| | | 10.50 | 1.58913 | 61.2 |
| | $R_{16} = 1463.638$ | | | |
| | | 129.26 | | |
| $L_9$ | $R_{17} = 312.156$ | | | |
| | | 3.00 | 1.74100 | 52.6 |
| | $R_{18} = 60.683$ | | | |
| | | 9.00 | | |
| $L_{10}$ | $R_{19} = -124.275$ | | | |
| | | 2.00 | 1.80609 | 40.9 |
| | $R_{20} = 87.224$ | | | |
| | | 7.00 | | |
| $L_{11}$ | $R_{21} = -97.663$ | | | |
| | | 2.00 | 1.72916 | 54.7 |
| $L_{12}$ | $R_{22} = 66.987$ | | | |
| | | 8.30 | 1.84665 | 23.9 |
| | $R_{23} = -198.160$ | | | |
| | | 11.24 | | |
| $L_{13}$ | $R_{24} = 380.255$ | | | |
| | | 7.00 | 1.49700 | 81.6 |
| | $R_{25} = -115.029$ | | | |
| | | 0.20 | | |
| $L_{14}$ | $R_{26} = 521.702$ | | | |
| | | 2.40 | 1.84665 | 23.9 |
| | $R_{27} = 90.397$ | | | |
| $L_{15}$ | | 10.00 | 1.49700 | 81.6 |
| | $R_{28} = -174.832$ | | | |
| | | 0.20 | | |
| | $R_{29} = 103.262$ | | | |

TABLE I-continued

| Element | Radius of Curvature (mm) | Axial Distance Between Surfaces (mm) | Nd | ν |
|---|---|---|---|---|
| $L_{16}$ | | 8.00 | 1.49700 | 81.6 |
| | $R_{30} = -183.397$ | | | |
| | | 0.20 | | |
| | $R_{31} = 96.388$ | | | |
| $L_{17}$ | | 6.00 | 1.49700 | 81.6 |
| | $R_{32} = 1604.787$ | | | |
| | | 44.25 | | |
| | $R_{33} = -88.209$ | | | |
| $L_{18}$ | | 2.00 | 1.77250 | 49.6 |
| | $R_{34} = 97.939$ | | | |
| | | 5.00 | | |
| ST | $R_{35} = \infty$ | | | |
| | | 6.50 | | |
| | $R_{36} = -326.150$ | | | |
| $L_{19}$ | | 2.00 | 1.77250 | 49.6 |
| | $R_{37} = 26.576$ | | | |
| $L_{20}$ | | 7.40 | 1.84665 | 23.9 |
| | $R_{38} = -121.151$ | | | |
| | | 5.30 | | |
| | $R_{39} = -31.960$ | | | |
| $L_{21}$ | | 2.00 | 1.80400 | 46.6 |
| | $R_{40} = -473.687$ | | | |
| | | 13.20 | | |
| | $R_{41} = -84.889$ | | | |
| $L_{22}$ | | 6.50 | 1.73399 | 51.5 |
| | $R_{42} = -37.823$ | | | |
| | | 4.00 | | |
| | $R_{43} = -335.152$ | | | |
| $L_{23}$ | | 5.00 | 1.51680 | 64.2 |
| | $R_{44} = -58.320$ | | | |
| | | 0.20 | | |
| | $R_{45} = 47.132$ | | | |
| $L_{24}$ | | 5.00 | 1.51741 | 52.4 |
| | $R_{46} = 76.556$ | | | |
| $L_{25}$ | | 2.00 | 1.83480 | 42.7 |
| | $R_{47} = 34.723$ | | | |
| | | 5.00 | | |
| | $R_{48} = 47.849$ | | | |
| $L_{26}$ | | 12.30 | 1.51680 | 64.2 |
| | $R_{49} = -28.721$ | | | |
| $L_{27}$ | | 2.00 | 1.80517 | 25.4 |
| | $R_{50} = -384.461$ | | | |
| | | 0.20 | | |
| | $R_{51} = 81.724$ | | | |
| $L_{28}$ | | 9.70 | 1.51680 | 64.2 |
| | $R_{51} = -46.855$ | | | |
| | | $D_{AX1}$ | | |
| ($L_{29}$–$L_{36}$) | | | | |
| | | $D_{AX2}$ | | |
| | $R_{66} = \infty$ | | | |
| $LP_1$ | | 33.00 | 1.58267 | 46.5 |
| | $R_{67} = \infty$ | | | |
| $LP_2$ | | 13.20 | 1.51633 | 64.0 |
| | $R_{68} = \infty$ | | | |

In Table I, the axial distances $D_{AX1}$ and $D_{AX2}$ are different according to oscillation isolating attachment lenses which are shown later.

FIGS. 10A, 10B, 10C and 10D show respectively spherical aberrations for g- and d-lines, astigmatism on sagittal (S) and tangential (T) planes, distortion and lateral chromatic aberration of the main lens $L_M$ at the wide-angle end.

The oscillation isolating attachment lens $L_A$ functions to increase the focal length of the zoom lens $L_M$ and balance longitudinal aberrations of both main lens $L_M$ and color separation prism 2.

Figure 2:
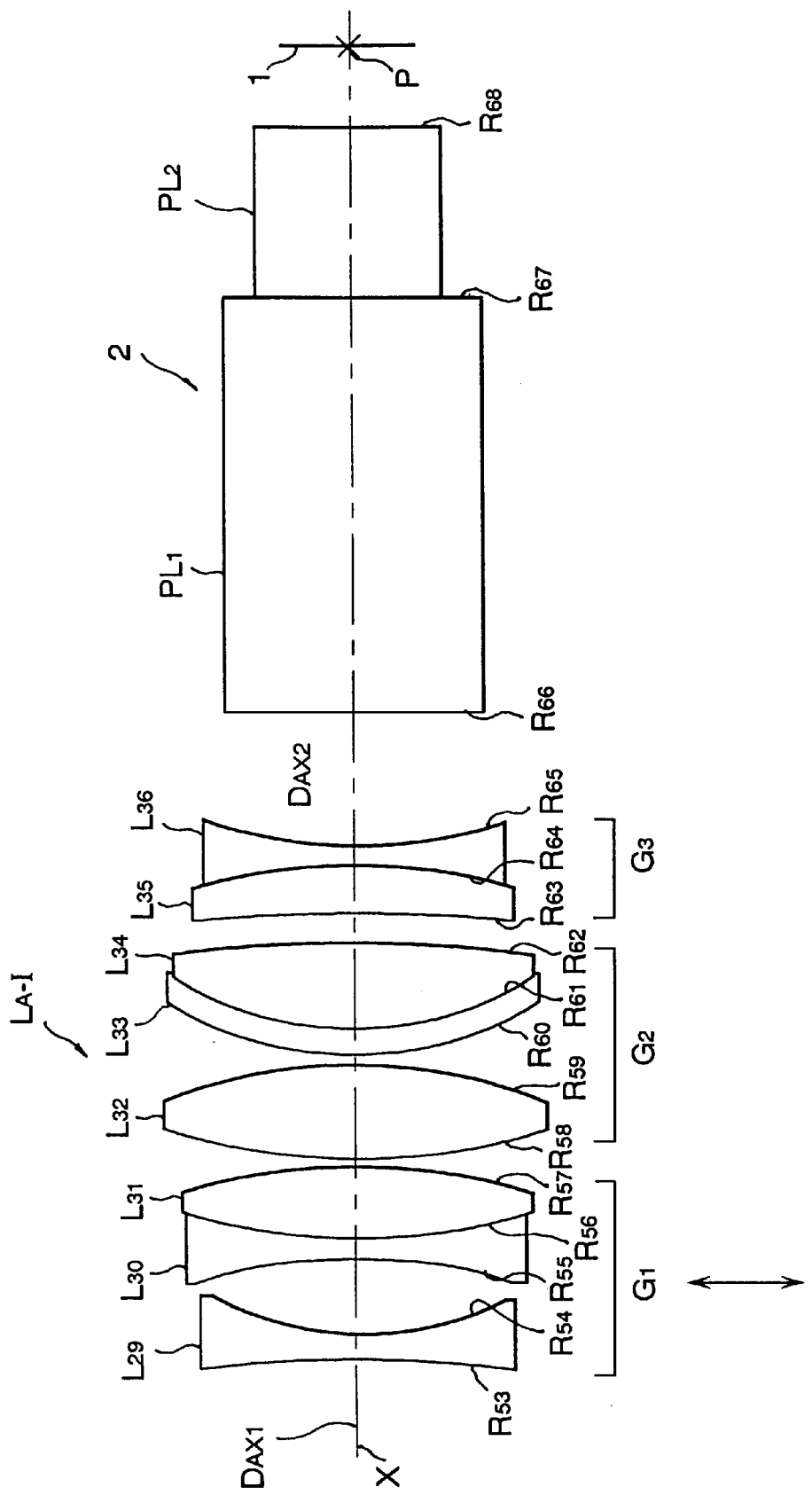
FIG. 2 is a schematic side view of an oscillation isolating attachment lens in accordance with an embodiment of the invention.

As shown in FIG. 2, the oscillation isolating attachment lens $L_A$ according to a first embodiment of the invention comprises a negative power first lens group $G_1$ comprising three lens elements $L_{29}$–$L_{31}$, a positive power second lens group $G_2$ comprising three lens elements $L_{32}$–$L_{34}$ and a negative power third lens group G3 comprising two lens elements L35 and L36, arranged in order from the object end. Specifically, the first lens group G1 includes a biconcave lens element L29 having a strong curvature at an image side surface and a cemented doublet consisting of a biconcave lens element L30 having a strong curvature at an object side surface and a biconvex lens element L31 having a strong curvature at an image side surface. The second lens group G2 includes a biconvex lens element L32 having a strong curvature at an image side surface and a cemented doublet consisting of a negative power meniscus lens element L33 having a convex object side surface and a biconvex lens element L34 having a strong curvature at an object side surface. The third lends group G3 includes a cemented doublet consisting of a positive power meniscus lens element L35 having a convex image side surface and a biconcave lens element L36 having a strong curvature at an object side surface. The first lens group G1 is capable of oscillating as one whole in a direction perpendicular to the optical axis X in response to a camera shake to cancel an oscillation of an image produced by the zoom lens LM due to the camera shake. The oscillation isolating attachment lens LA thus designed has a long back-focal distance and a long distance to the exit pupil, which is always desirable not only to provide a margin for laying out the color separation prism assembly 2 and filters between the oscillation isolating attachment lens LA and the image plane of the television camera but also to prevent an occurrence of color shading.

The oscillation isolating attachment lens LA is further designed and adapted to have a magnification β satisfying the following condition (1):

$$1.1 \leq \beta < 1.3 \quad (1)$$

When the upper limit is exceeded, the magnification of the overall optical system of the zoom lens LM and the oscillation isolating attachment lens LA becomes greater than 1.3 times as large as the magnification of the zoom lens LM, which makes the overall optical system slow. The oscillation isolating attachment lens LA having a magnification between 1.1 and 1.3 can be equipped with an oscillation isolating feature without modifying optical dimensions of the zoom lens LM.

The oscillation isolating attachment lens LA are further designed and adapted to satisfy the following conditions (2) through (6):

$$0.1 \leq |f_1/f_3| \leq 0.7 \quad (2)$$

$$1.8 < N_1 \quad (3)$$

$$1.8 < N_2 \quad (4)$$

$$\nu_3 < \nu_2 \quad (5)$$

$$\nu_{3bcc} < 30 \quad (6)$$

where f3 is the overall focal length of the first lens group G1;
f3 is the overall focal length of the third lens group G3;
N1 is the index of refraction of the first lens element of the first lens group G1;
N2 is the index of refraction of the second lens element of the first lens group G1;
ν2 is the Abbe number of the second lens element of the first lens group G1;
ν3 is the Abbe number of the third lens element of the first lens group G1;
ν3bcc is the Abbe number of the biconcave lens element of the third lens group G3;

When the third lens group G3 has a negative power, satisfaction of the condition (2) by the third lens group G4 provides a suitable axial distance to the exit pupil. If the lower limit is exceeded, the axial distance to the exit pupil is too short to prevent an occurrence of color shading. On the other hand, if the upper limit is exceeded, while the axial distance to the exit pupil is sufficiently long, the third lens group G3 has a negative power too strong to prevent aggravation of balancing longitudinal chromatic aberrations due to an increase in magnification.

The conditions (3) and (4) yield a negative power of the overall oscillation isolating attachment lens LA by which the Petzval sum is shifted toward a minus value to prevent or significantly reduce aggravation of field curvature. If both limits are exceeded, the Petzval sum becomes minus in excess, leading aggravation of field curvature which reduces the performance of the oscillation isolating attachment lens LA. The conditions (5) and (6) are necessary for properly balancing axial and lateral chromatic aberrations. If the condition (5) is unsatisfied, the axial chromatic aberration for blue light rays is over corrected to focus blue light rays beyond the focal plane, and the axial chromatic aberration for red light rays is under corrected. If the condition (6) is unsatisfied, the lateral chromatic aberrations are unbalanced. Specifically, the lateral chromatic aberration for blue light rays is under corrected, and the lateral chromatic aberration for red light rays is over corrected, which cause a color blur on an image.

The oscillation isolating attachment lens LA-I according to the first embodiment is substantially described in Table II.

TABLE II

| Element | Radius of Curvature (mm) | Axial Distance Between Surfaces (mm) | N | ν |
|---|---|---|---|---|
| L29 | $R_{53} = -168.152$ | 2.00 | 1.88299 | 40.9 |
|  | $R_{54} = 28.154$ | 6.00 |  |  |
| L30 | $R_{55} = -37.612$ | 2.00 | 1.88299 | 40.9 |
|  | $R_{56} = 64.825$ |  |  |  |
| L31 |  | 5.00 | 1.84665 | 23.9 |
|  | $R_{57} = -44.521$ | 0.80 |  |  |
| L32 | $R_{58} = 56.895$ | 8.00 | 1.48749 | 70.4 |
|  | $R_{59} = -38.251$ | 0.80 |  |  |
| L33 | $R_{60} = 33.028$ | 2.00 | 1.80501 | 39.6 |
|  | $R_{61} = 29.858$ |  |  |  |
| L34 |  | 6.50 | 1.48749 | 70.4 |
|  | $R_{62} = -97.450$ | 2.00 |  |  |
| L35 | $R_{63} = -219.587$ | 4.30 | 1.48749 | 70.4 |
|  | $R_{64} = -63.886$ |  |  |  |
| L36 |  | 2.00 | 1.80517 | 25.4 |
|  | $R_{65} = 83.853$ |  |  |  |

| Parameters | | | | | | |
|---|---|---|---|---|---|---|
| β | $|f_1/f_3|$ | $N_1$ | $N_2$ | $\nu_2$ | $\nu_3$ | $\nu_{3bcc}$ |
| 1.266 | 0.461 | 1.88299 | 1.88229 | 40.9 | 23.9 | 25.4 |

As apparent from the Table II, the oscillation isolating attachment lens LA-I satisfies the conditions (1) through (6) set forth.

FIGS. 11A, 11B, 11C and 11D show respectively spherical aberrations for g- and d-lines, astigmatism on sagittal (S)

and tangential (T) planes, distortion and lateral chromatic aberration of the oscillation isolating attachment lens $L_A$-I. As apparent, the oscillation isolating attachment lens $L_A$-I suitably balances the aberrations of the optical lens system.

Figure 3:
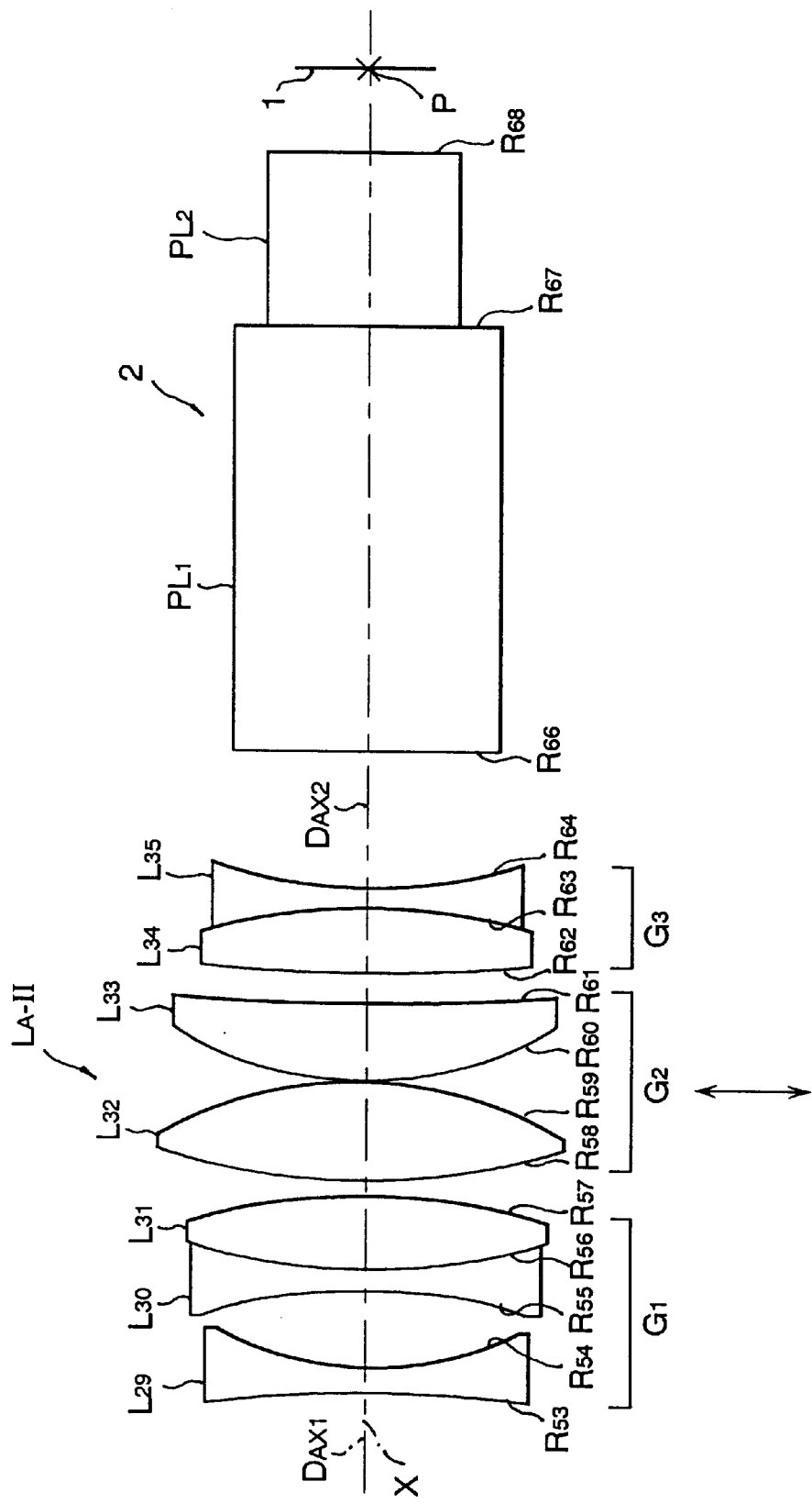
FIG. 3 is a schematic side view of an oscillation isolating attachment lens in accordance with another embodiment of the invention.

As shown in FIG. 3, an oscillation isolating attachment lens $L_A$-II according to a second embodiment of the invention comprises a negative power first lens group $G_1$ comprising three lens elements $L_{29}$–$L_{31}$, a positive power second lens group $G_2$ comprising two lens elements $L_{32}$ and $L_{33}$ and a negative power third lens group $G_3$ comprising two lens elements $L_{34}$ and $L_{35}$, arranged in order from the object end. Specifically, the first lens group $G_1$ includes a biconcave lens element $L_{29}$ having a strong curvature at an image side surface and a cemented doublet consisting of a biconcave lens element $L_{30}$ having a strong curvature at an object side surface and a biconvex lens element $L_{31}$ having a strong curvature at an image side surface. The second lens group $G_2$ includes a biconvex lens element $L_{32}$ having a strong curvature at an image side surface and a positive meniscus lens element $L_{33}$ having a convex object side surface. The third lends group $G_3$ includes a cemented doublet consisting of a biconvex lens element $L_{34}$ having a strong curvature at an image side surface and a biconcave lens element $L_{35}$ having a strong curvature at an image side surface. The second lens group $G_2$ is capable of oscillating as one whole in a direction perpendicular to the optical axis X in response to a camera shake to cancel an oscillation of an image produced by the zoom lens $L_M$ due to the camera shake. The oscillation isolating attachment lens $L_A$ thus designed has a long back-focal distance and a long distance to the exit pupil, which is always desirable not only to provide a margin for laying out the color separation prism assembly 2 and filters between the oscillation isolating attachment lens $L_A$ and the image plane of the television camera but also to prevent an occurrence of color shading.

The oscillation isolating attachment lens $L_A$-II according to the second embodiment is substantially described in Table III.

TABLE III

| Element | Radius of Curvature (mm) | Axial Distance Between Surfaces (mm) | N | ν |
|---|---|---|---|---|
| $L_{29}$ | $R_{53} = -109.703$ | 2.00 | 1.88299 | 40.9 |
|  | $R_{54} = 26.855$ | 6.00 |  |  |
| $L_{30}$ | $R_{55} = -41.529$ | 2.00 | 1.88299 | 40.9 |
|  | $R_{56} = 67.963$ |  |  |  |
| $L_{31}$ |  | 5.00 | 1.84665 | 23.9 |
|  | $R_{57} = -45.753$ | 2.00 |  |  |
| $L_{32}$ | $R_{58} = 64.042$ | 8.00 | 1.48749 | 70.4 |
|  | $R_{59} = -31.375$ | 0.20 |  |  |
| $L_{33}$ | $R_{60} = 30.963$ | 6.50 | 1.48749 | 70.4 |
|  | $R_{61} = 1122.385$ | 2.00 |  |  |
|  | $R_{62} = 218.113$ |  |  |  |

TABLE III-continued

| $L_{34}$ |  | 4.30 | 1.48749 | 70.4 |
|---|---|---|---|---|
|  | $R_{63} = -93.597$ |  |  |  |
| $L_{35}$ |  | 2.00 | 1.80517 | 25.4 |
|  | $R_{64} = 67.116$ |  |  |  |

| Parameters | | | | | |
|---|---|---|---|---|---|
| β | $|f_1/f_3|$ | $N_1$ | $N_2$ | $\nu_2$ | $\nu_3$ | $\nu_{3bcc}$ |
| 1.183 | 0.317 | 1.88299 | 1.88229 | 40.9 | 23.9 | 25.4 |

As apparent from the Table III, the oscillation isolating attachment lens $L_A$-II satisfies the conditions (1) through (6) set forth.

FIGS. 12A, 12B, 12C and 12D show respectively spherical aberrations for g- and d-lines, astigmatism on sagittal (S) and tangential (T) planes, distortion and lateral chromatic aberration of the oscillation isolating attachment lens $L_A$-II. As apparent, the oscillation isolating attachment lens $L_A$-II suitably balances the aberrations of the lens system.

Figure 4:
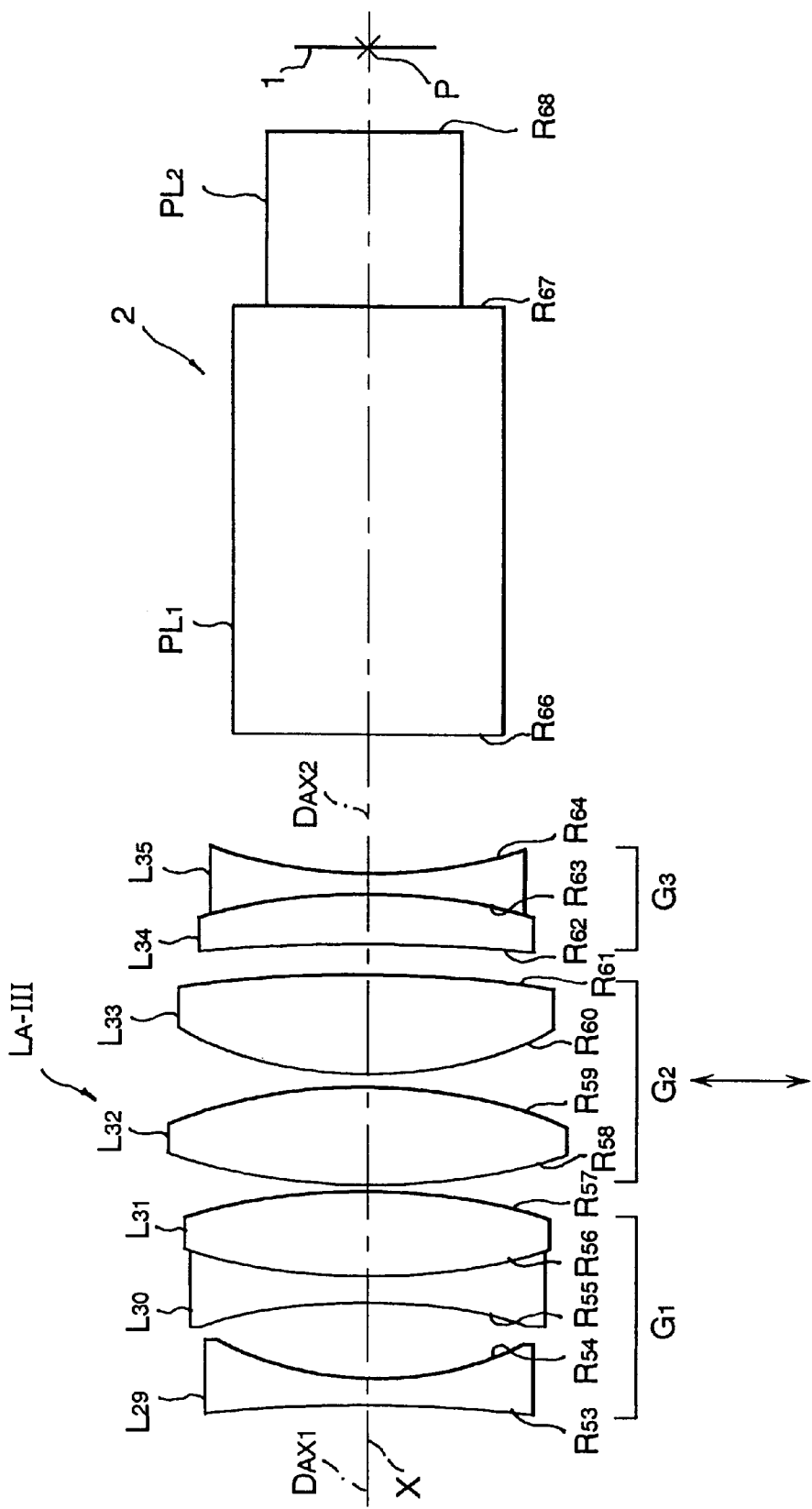
FIG. 4 is a schematic side view of an oscillation isolating attachment lens in accordance with another embodiment of the invention.

FIG. 4 shows an oscillation isolating attachment lens $L_A$-III according to a third embodiment of the invention comprises a negative power first lens group $G_1$ comprising three lens elements $L_{29}$–$L_{31}$, a positive power second lens group $G_2$ comprising three lens elements $L_{32}$ and $L_{33}$ and a negative power third lens group $G_3$ comprising two lens elements $L_{34}$ and $L_{35}$, arranged in order from the object end. The first lens group $G_1$ includes a biconcave lens element $L_{29}$ having a strong curvature at an image side surface and a cemented doublet consisting of a biconcave lens element $L_{30}$ having a strong curvature at an object side surface and a biconvex lens element $L_{31}$ having a strong curvature at an image side surface. The second lens group $G_2$ includes a biconvex lens element $L_{32}$ having a strong curvature at an image side surface and a biconvex lens element $L_{33}$ having a strong curvature at an object side surface. The third lends group $G_3$ includes a cemented doublet consisting of a positive power meniscus lens element $L_{34}$ having a convex image side surface and a biconcave lens element $L_{35}$ having a strong curvature at an image side surface. The second lens group $G_2$ is capable of oscillating as one whole in a direction perpendicular to the optical axis X in response to a camera shake to cancel an oscillation of an image produced by the zoom lens $L_M$ due to the camera shake. The oscillation isolating attachment lens $L_A$ thus designed has a long back-focal distance and a long distance to the exit pupil, which is always desirable not only to provide a margin for laying out the color separation prism assembly 2 and filters between the oscillation isolating attachment lens $L_A$ and the image plane of the television camera but also to prevent an occurrence of color shading.

The oscillation isolating attachment lens $L_A$-III according to the third embodiment is substantially described in Table IV.

TABLE IV

| Element | Radius of Curvature (mm) | Axial Distance Between Surfaces (mm) | N | ν |
|---|---|---|---|---|
| $L_{29}$ | $R_{53} = -179.209$ | 2.00 | 1.88299 | 40.9 |
|  | $R_{54} = 28.735$ | 6.00 |  |  |
| $L_{30}$ | $R_{55} = -42.892$ | 2.00 | 1.88299 | 40.9 |

TABLE IV-continued

| | | | | |
|---|---|---|---|---|
| | $R_{56}$ = 60.094 | | | |
| $L_{31}$ | | 6.00 | 1.84665 | 23.9 |
| | $R_{57}$ = −48.319 | | | |
| | | 0.80 | | |
| | $R_{58}$ = 56.589 | | | |
| $L_{32}$ | | 8.00 | 1.48749 | 70.4 |
| | $R_{59}$ = −40.766 | | | |
| | | 0.80 | | |
| | $R_{60}$ = 32.613 | | | |
| $L_{33}$ | | 7.00 | 1.48749 | 70.4 |
| | $R_{61}$ = −101.656 | | | |
| | | 2.00 | | |
| | $R_{62}$ = −232.063 | | | |
| $L_{34}$ | | 3.80 | 1.48749 | 70.4 |
| | $R_{63}$ = −78.505 | | | |
| $L_{35}$ | | 2.00 | 1.80517 | 25.4 |
| | $R_{64}$ = 66.304 | | | |

Parameters

| $\beta$ | $|f_1/f_3|$ | $N_1$ | $N_2$ | $\nu_2$ | $\nu_3$ | $\nu_{3bcc}$ |
|---|---|---|---|---|---|---|
| 1.253 | 0.515 | 1.88299 | 1.88229 | 40.9 | 23.9 | 25.4 |

As apparent from the Table IV, the oscillation isolating attachment lens LA-III satisfies the conditions (1) through (6) set forth.

FIGS. 13A, 13B, 13C and 13D show respectively spherical aberrations for g- and d-lines, astigmatism on sagittal (S) and tangential (T) planes, distortion and lateral chromatic aberration of the oscillation isolating attachment lens LA-III. As apparent, the oscillation isolating attachment lens LA-III suitably balances the aberrations of the lens system.

Figure 5:
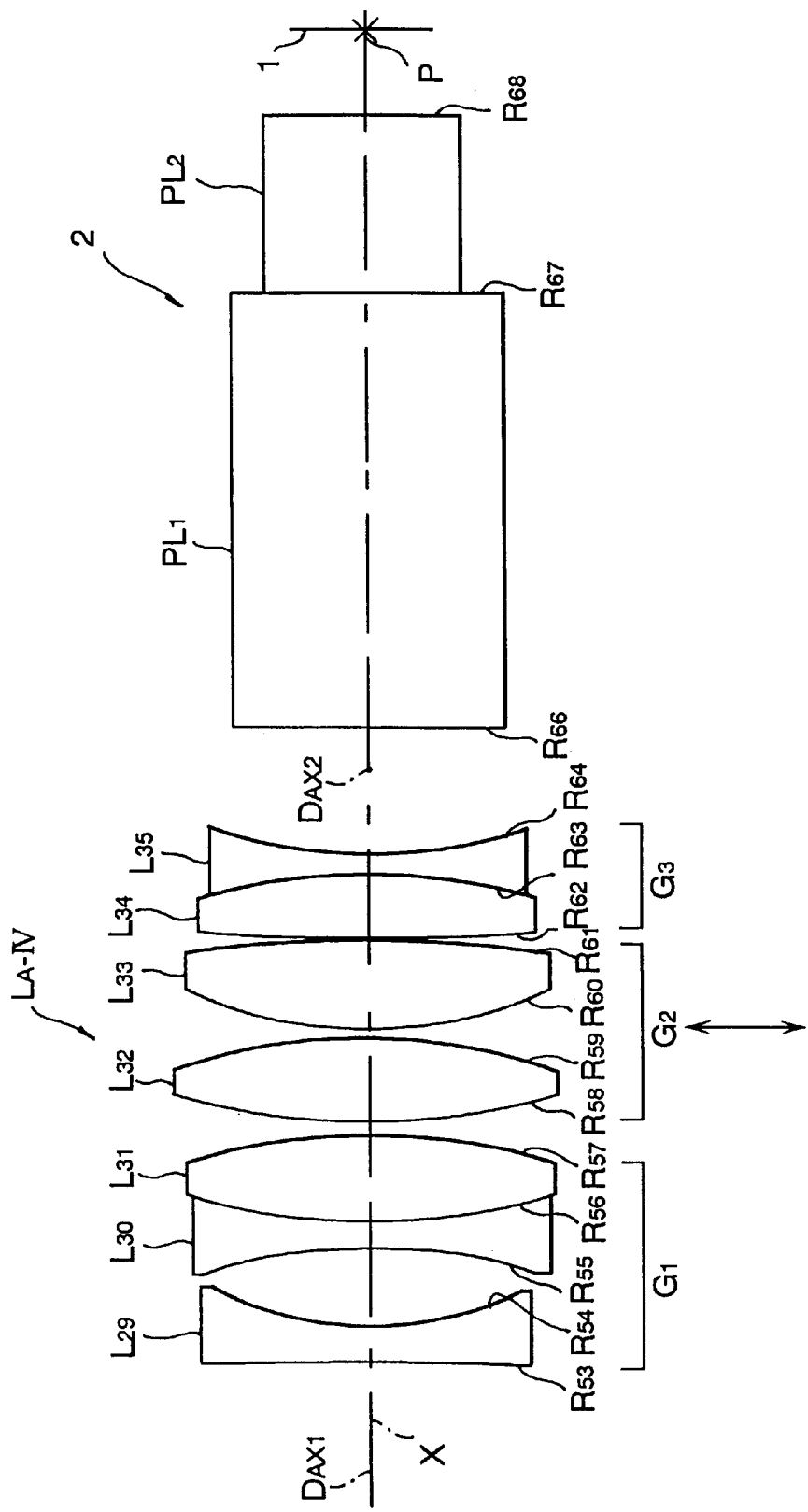
FIG. 5 is a schematic side view of an oscillation isolating attachment lens in accordance with another embodiment of the invention.

FIG. 5 shows an oscillation isolating attachment lens LA-IV according to a fourth embodiment of the invention. The oscillation isolating attachment lens LA-IV comprises a negative power first lens group G1 comprising three lens elements L29–L31, a positive power second lens group G2 comprising a single lens element L32 and a positive power third lens group G3 comprising three lens elements L33–L35, arranged in order from the object end. Specifically, the first lens group G1 includes a negative power meniscus lens element L29 having a concave image side surface and a cemented doublet consisting of a biconcave lens element L30 having a strong curvature at an object side surface and a biconvex lens element L31 having a strong curvature at an image side surface. The second lens group G2 includes a single biconvex lens element L32 having a strong curvature at an object side surface. The third lends group G3 includes a biconvex lens element L33 having a strong curvature at an image side surface and a cemented doublet consisting of a biconvex lens element L34 having a strong curvature at an image side surface and a biconcave lens element L35 having a strong curvature at an image side surface. The second lens group G2 is capable of oscillating as one whole in a direction perpendicular to the optical axis X in response to a camera shake to cancel an oscillation of an image produced by the zoom lens LM due to the camera shake. The oscillation isolating attachment lens LA thus designed has a long back-focal distance and a long distance to the exit pupil, which is always desirable not only to provide a margin for laying out the color separation prism assembly 2 and filters between the oscillation isolating attachment lens LA and the image plane of the television camera but also to prevent an occurrence of color shading.

The oscillation isolating attachment lens LA-IV according to the fourth embodiment is substantially described in Table V.

TABLE V

| Element | Radius of Curvature (mm) | Axial Distance Between Surfaces (mm) | N | ν |
|---|---|---|---|---|
| | $R_{53}$ = 2797.373 | | | |
| $L_{29}$ | | 2.00 | 1.83480 | 42.7 |
| | $R_{54}$ = 26.378 | | | |
| | | 6.00 | | |
| | $R_{55}$ = −37.824 | | | |
| $L_{30}$ | | 2.00 | 1.88299 | 40.9 |
| | $R_{56}$ = 55.071 | | | |
| $L_{31}$ | | 6.50 | 1.84665 | 23.9 |
| | $R_{57}$ = −46.020 | | | |
| | | 0.80 | | |
| | $R_{58}$ = 57.904 | | | |
| $L_{32}$ | | 6.00 | 1.59240 | 68.3 |
| | $R_{59}$ = −76.254 | | | |
| | | 0.80 | | |
| | $R_{60}$ = 33.833 | | | |
| $L_{33}$ | | 6.50 | 1.48749 | 70.2 |
| | $R_{61}$ = −95.143 | | | |
| | | 0.20 | | |
| | $R_{62}$ = 147.899 | | | |
| $L_{34}$ | | 3.80 | 1.48749 | 70.2 |
| | $R_{63}$ = −106.164 | | | |
| $L_{35}$ | | 2.00 | 1.80517 | 25.4 |
| | $R_{64}$ = 50.934 | | | |

Parameters

| $\beta$ | $|f_1/f_3|$ | $N_1$ | $N_2$ | $\nu_2$ | $\nu_3$ | $\nu_{3bcc}$ |
|---|---|---|---|---|---|---|
| 1.229 | 0.489 | 1.83480 | 1.88229 | 40.7 | 23.9 | 25.4 |

As apparent from the Table V, the oscillation isolating attachment lens LA-IV satisfies the conditions (1) through (6) set forth.

FIGS. 14A, 14B, 14C and 14D show respectively spherical aberrations for g- and d-lines, astigmatism on sagittal (S) and tangential (T) planes, distortion and lateral chromatic aberration of the oscillation isolating attachment lens LA-IV. As apparent, the oscillation isolating attachment lens LA-IV suitably balances the aberrations of the lens system.

Figure 6:
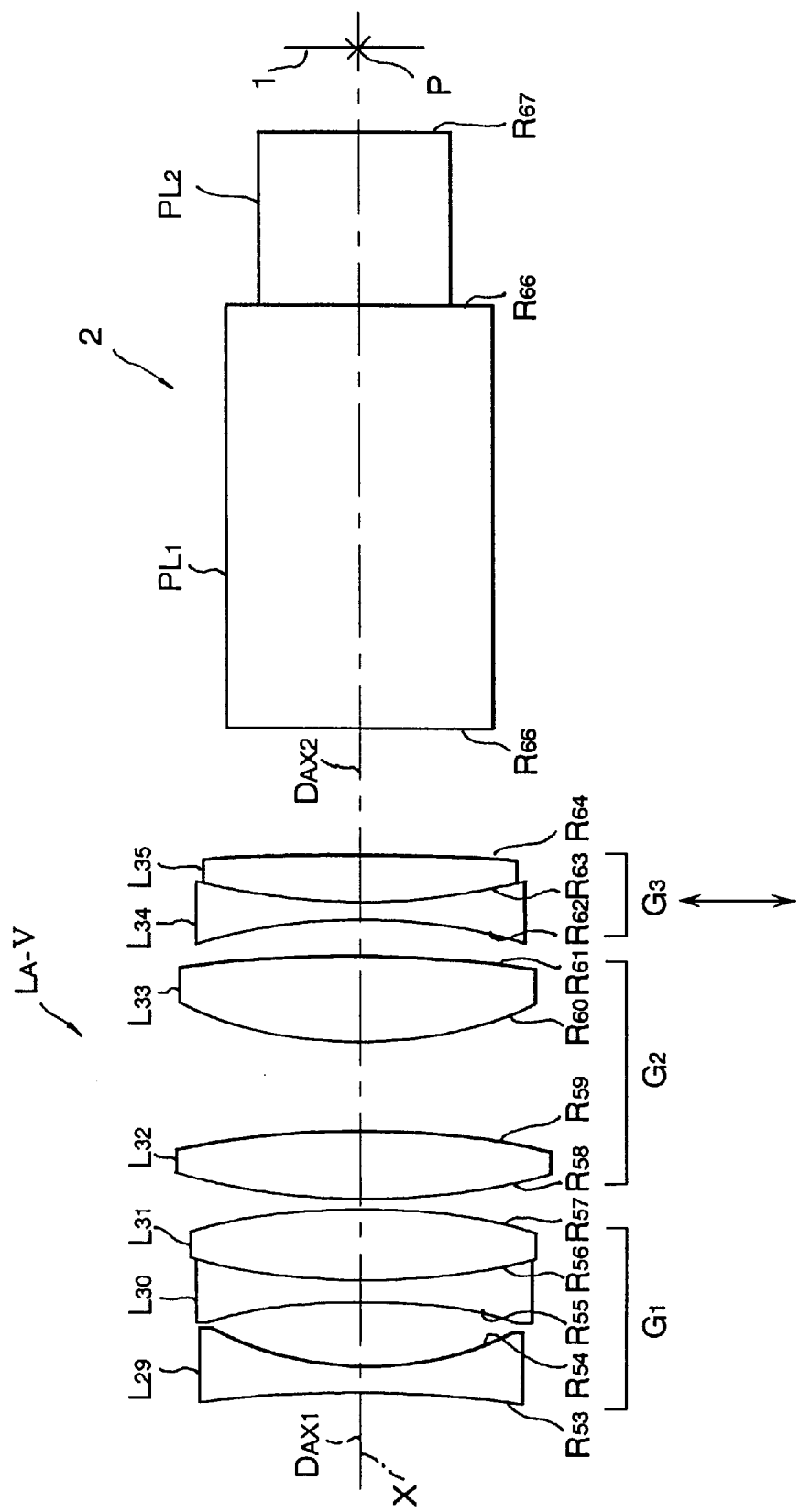
FIG. 6 is a schematic side view of an oscillation isolating attachment lens in accordance with another embodiment of the invention.

FIG. 6 shows an oscillation isolating attachment lens LA-V according to a fifth embodiment of the invention. The oscillation isolating attachment lens LA-V comprises a negative power first lens group G1 comprising three lens elements L29–L31, a positive power second lens group G2 comprising two lens elements L32 and L33 and a negative power third lens group G3 comprising two lens elements L34 and L35, arranged in order from the object end. Specifically, the first lens group G1 includes a negative meniscus lens element L29 having a convex object side surface and a cemented doublet consisting of a biconcave lens element L30 having a strong curvature at an object side surface and a biconvex lens element L31 having a strong curvature at an image side surface. The second lens group G2 includes a biconvex lens element L32 having a strong curvature at an image side surface and a positive meniscus lens element L33 having a convex object side surface. The third lends group G3 includes a cemented doublet consisting of a biconcave lens element L34 having a strong curvature at an image side surface and a biconvex lens element L35 having a strong curvature at an object side surface. The third lens group G3 is capable of oscillating as one whole in a direction perpendicular to the optical axis X in response to a camera shake to cancel an oscillation of an image produced by the zoom lens LM due to the camera shake. The oscillation isolating attachment lens LA thus designed has a long back-focal distance and a long distance to the exit pupil, which is always desirable not only to provide a margin for laying out the color separation prism assembly 2 and filters between the oscillation isolating attachment lens LA and the image plane of the television camera but also to prevent an occurrence of color shading.

The oscillation isolating attachment lens LA-V according to the fifth embodiment is substantially described in Table VI.

TABLE VI

| Element | Radius of Curvature (mm) | Axial Distance Between Surfaces (mm) | N | ν |
|---|---|---|---|---|
| $L_{29}$ | $R_{53}$ = 492.588 | 2.00 | 1.88299 | 40.7 |
| | $R_{54}$ = 25.720 | 5.50 | | |
| $L_{30}$ | $R_{55}$ = −48.387 | 2.00 | 1.88299 | 40.7 |
| | $R_{56}$ = 58.584 | | | |
| $L_{31}$ | | 5.00 | 1.84665 | 23.9 |
| | $R_{57}$ = −69.231 | 0.60 | | |
| | $R_{58}$ = 57.189 | | | |
| $L_{32}$ | | 5.30 | 1.77250 | 49.6 |
| | $R_{59}$ = −122.978 | 7.48 | | |
| | $R_{60}$ = 52.209 | | | |
| $L_{33}$ | | 6.20 | 1.52249 | 59.8 |
| | $R_{61}$ = −61.879 | 2.00 | | |
| | $R_{62}$ = −133.222 | | | |
| $L_{34}$ | | 2.00 | 1.80517 | 25.4 |
| | $R_{63}$ = 65.902 | | | |
| $L_{35}$ | | 3.23 | 1.48749 | 70.2 |
| | $R_{64}$ = −368.221 | | | |

| Parameters | | | | | | |
|---|---|---|---|---|---|---|
| β | $|f_1/f_3|$ | $N_1$ | $N_2$ | $ν_2$ | $ν_3$ | $ν_{3bcc}$ |
| 1.254 | 0.274 | 1.88299 | 1.88229 | 40.7 | 23.9 | 25.4 |

As apparent from the Table VI, the oscillation isolating attachment lens LA-V satisfies the conditions (1) through (6) set forth.

FIGS. 15A, 15B, 15C and 15D show respectively spherical aberrations for g- and d-lines, astigmatism on sagittal (S) and tangential (T) planes, distortion and lateral chromatic aberration of the oscillation isolating attachment lens LA-V. As apparent, the oscillation isolating attachment lens LA-V suitably balances the aberrations of the lens system.

Figure 7:
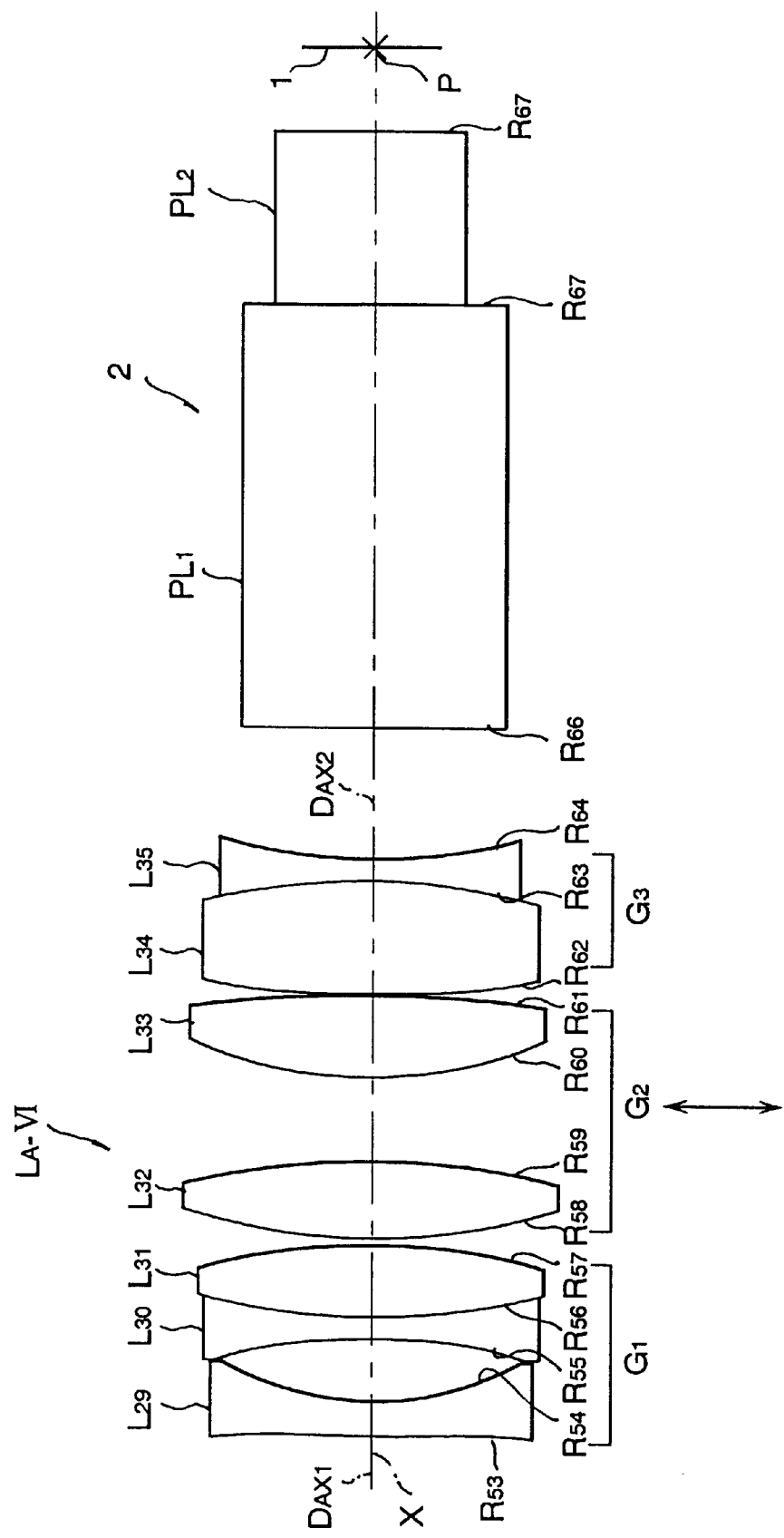
FIG. 7 is a schematic side view of an oscillation isolating attachment lens in accordance with another embodiment of the invention.

FIG. 7 shows an oscillation isolating attachment lens LA-VI according to a sixth embodiment of the invention. The oscillation isolating attachment lens LA-VI comprises a negative power first lens group G1 comprising three lens elements L29–L31, a positive power second lens group G2 comprising two lens elements L32 and L33 and a negative power third lens group G3 comprising two lens elements L34 and L35, arranged in order from the object end. The first lens group G1 includes a negative meniscus lens element L29 having a convex object side surface and a cemented doublet consisting of a biconcave lens element L30 having a strong curvature at an object side surface and a biconvex lens element L31 having a strong curvature at an image side surface. The second lens group G2 includes a biconvex lens element L32 having a strong curvature at an image side surface and a positive meniscus lens element L33 having a convex object side surface. The third lends group G3 includes a cemented doublet consisting of a biconvex lens element L34 having a strong curvature at an image side surface and a biconcave lens element L35 having a strong curvature at an object side surface. The second lens group G2 is capable of oscillating as one whole in a direction perpendicular to the optical axis X in response to a camera shake to cancel an oscillation of an image produced by the zoom lens LM due to the camera shake. The oscillation isolating attachment lens LA thus designed has a long back-focal distance and a long distance to the exit pupil, which is always desirable not only to provide a margin for laying out the color separation prism assembly 2 and filters between the oscillation isolating attachment lens LA and the image plane of the television camera but also to prevent an occurrence of color shading.

The oscillation isolating attachment lens LA-VI according to the sixth embodiment is substantially described in Table VII.

TABLE VII

| Element | Radius of Curvature (mm) | Axial Distance Between Surfaces (mm) | N | ν |
|---|---|---|---|---|
| $L_{29}$ | $R_{53}$ = 410.081 | 2.00 | 1.88299 | 40.7 |
| | $R_{54}$ = 24.795 | 5.50 | | |
| $L_{30}$ | $R_{55}$ = −40.951 | 2.00 | 1.88299 | 40.7 |
| | $R_{56}$ = 65.684 | | | |
| $L_{31}$ | | 5.00 | 1.84665 | 23.9 |
| | $R_{57}$ = −61.170 | 0.60 | | |
| | $R_{58}$ = 65.602 | | | |
| $L_{32}$ | | 5.30 | 1.77250 | 49.6 |
| | $R_{59}$ = −135.616 | 7.06 | | |
| | $R_{60}$ = 49.875 | | | |
| $L_{33}$ | | 6.20 | 1.52249 | 59.8 |
| | $R_{61}$ = −59.794 | 0.20 | | |
| | $R_{62}$ = 127.338 | | | |
| $L_{34}$ | | 8.33 | 1.48749 | 70.2 |
| | $R_{63}$ = −62.705 | | | |
| $L_{35}$ | | 2.00 | 1.80517 | 25.4 |
| | $R_{64}$ = 112.935 | | | |

| Parameters | | | | | | |
|---|---|---|---|---|---|---|
| β | $|f_1/f_3|$ | $N_1$ | $N_2$ | $ν_2$ | $ν_3$ | $ν_{3bcc}$ |
| 1.253 | 0.243 | 1.88299 | 1.88229 | 40.7 | 23.9 | 25.4 |

As apparent from the Table VI, the oscillation isolating attachment lens LA-VI satisfies the conditions (1) through (6) set forth.

FIGS. 16A, 16B, 16C and 16D show respectively spherical aberrations for g- and d-lines, astigmatism on sagittal (S) and tangential (T) planes, distortion and lateral chromatic aberration of the oscillation isolating attachment lens LA-VI. As apparent, the oscillation isolating attachment lens LA-VI suitably balances the aberrations of the lens system.

Figure 8:
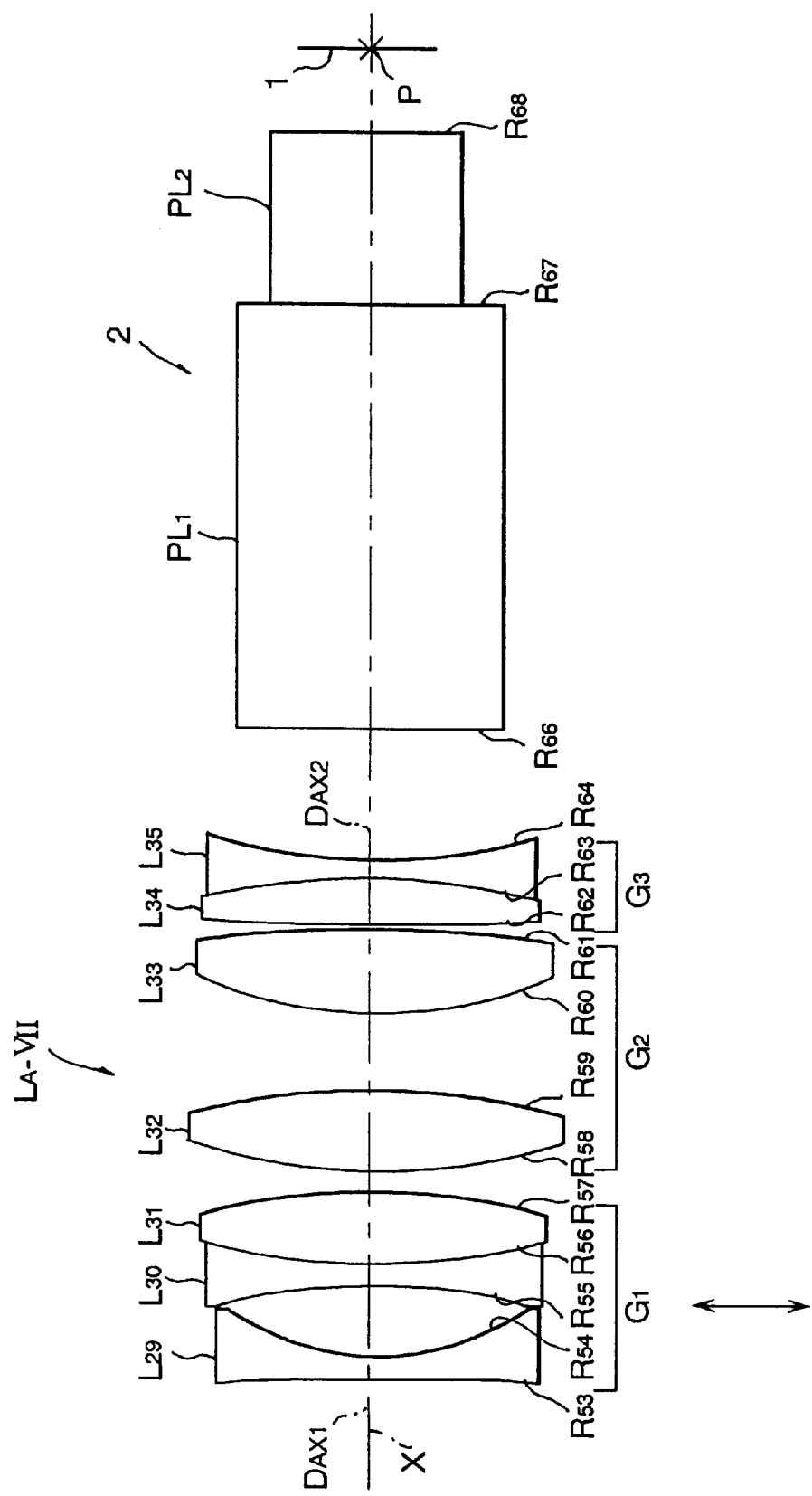
FIG. 8 is a schematic side view of an oscillation isolating attachment lens in accordance with another embodiment of the invention.

FIG. 8 shows an oscillation isolating attachment lens LA-VII according to a seventh embodiment of the invention. The oscillation isolating attachment lens LA-VII comprises a negative power first lens group G1 comprising three lens elements L29–L31, a positive power second lens group G2 comprising a single lens element L32 and a positive power third lens group G3 comprising three lens elements L33–L35, arranged in order from the object end. Specifically, the first lens group G1 includes a negative power meniscus lens element L29 having a concave image side surface and a cemented doublet consisting of a biconcave lens element L30 having a strong curvature at an object side surface and a biconvex lens element L31 having a strong curvature at an image side surface. The second lens group G2 includes a single biconvex lens element $L_{32}$ having a strong curvature at an object side surface. The third lends group $G_3$ includes a biconvex lens element $L_{33}$ having a strong curvature at an image side surface and a cemented doublet consisting of a biconvex lens element $L_{34}$ having a strong curvature at an image side surface and a biconcave lens element $L_{35}$ having a strong curvature at an image side surface. The first lens group $G_1$ is capable of oscillating as one whole in a direction perpendicular to the optical axis X in response to a camera shake to cancel an oscillation of an image produced by the zoom lens $L_M$ due to the camera shake. The oscillation isolating attachment lens $L_A$ thus designed has a long back-focal distance and a long distance to the exit pupil, which is always desirable not only to provide a margin for laying out the color separation prism assembly 2 and filters between the oscillation isolating attachment lens $L_A$ and the image plane of the television camera but also to prevent an occurrence of color shading.

The oscillation isolating attachment lens $L_A$-VII according to the seventh embodiment is substantially described in Table VIII.

TABLE VIII

| Element | Radius of Curvature (mm) | Axial Distance Between Surfaces (mm) | N | ν |
|---|---|---|---|---|
| $L_{29}$ | $R_{53}$ = 491.656 | 2.00 | 1.88299 | 40.7 |
|  | $R_{54}$ = 25.878 | 5.50 |  |  |
| $L_{30}$ | $R_{55}$ = −40.339 | 2.00 | 1.83400 | 37.1 |
|  | $R_{56}$ = 63.286 |  |  |  |
| $L_{31}$ |  | 5.00 | 1.84665 | 23.9 |
|  | $R_{57}$ = −54.370 | 1.67 |  |  |
|  | $R_{58}$ = 53.378 |  |  |  |
| $L_{32}$ |  | 6.00 | 1.61340 | 43.8 |
|  | $R_{59}$ = −89.146 | 6.22 |  |  |
|  | $R_{60}$ = 42.978 |  |  |  |
| $L_{33}$ |  | 6.20 | 1.48749 | 70.2 |
|  | $R_{61}$ = −72.048 | 0.20 |  |  |
|  | $R_{62}$ = 189.880 |  |  |  |
| $L_{34}$ |  | 3.30 | 1.48749 | 70.2 |
|  | $R_{63}$ = −85.505 |  |  |  |
| $L_{35}$ |  | 2.00 | 1.80517 | 25.4 |
|  | $R_{64}$ = 78.310 |  |  |  |

| Parameters | | | | | |
|---|---|---|---|---|---|
| β | $|f_1/f_3|$ | $N_1$ | $N_2$ | $ν_2$ | $ν_3$ | $ν_{3bcc}$ |
| 1.256 | 0.352 | 1.88299 | 1.83400 | 37.1 | 23.9 | 25.4 |

As apparent from the Table VIII, the oscillation isolating attachment lens $L_A$-VII satisfies the conditions (1) through (6) set forth.

FIGS. 17A, 17B, 17C and 17D show respectively spherical aberrations for g- and d-lines, astigmatism on sagittal (S) and tangential (T) planes, distortion and lateral chromatic aberration of the oscillation isolating attachment lens $L_A$-VII. As apparent, the oscillation isolating attachment lens $L_A$-VII suitably balances the aberrations of the lens system.

Figure 9:
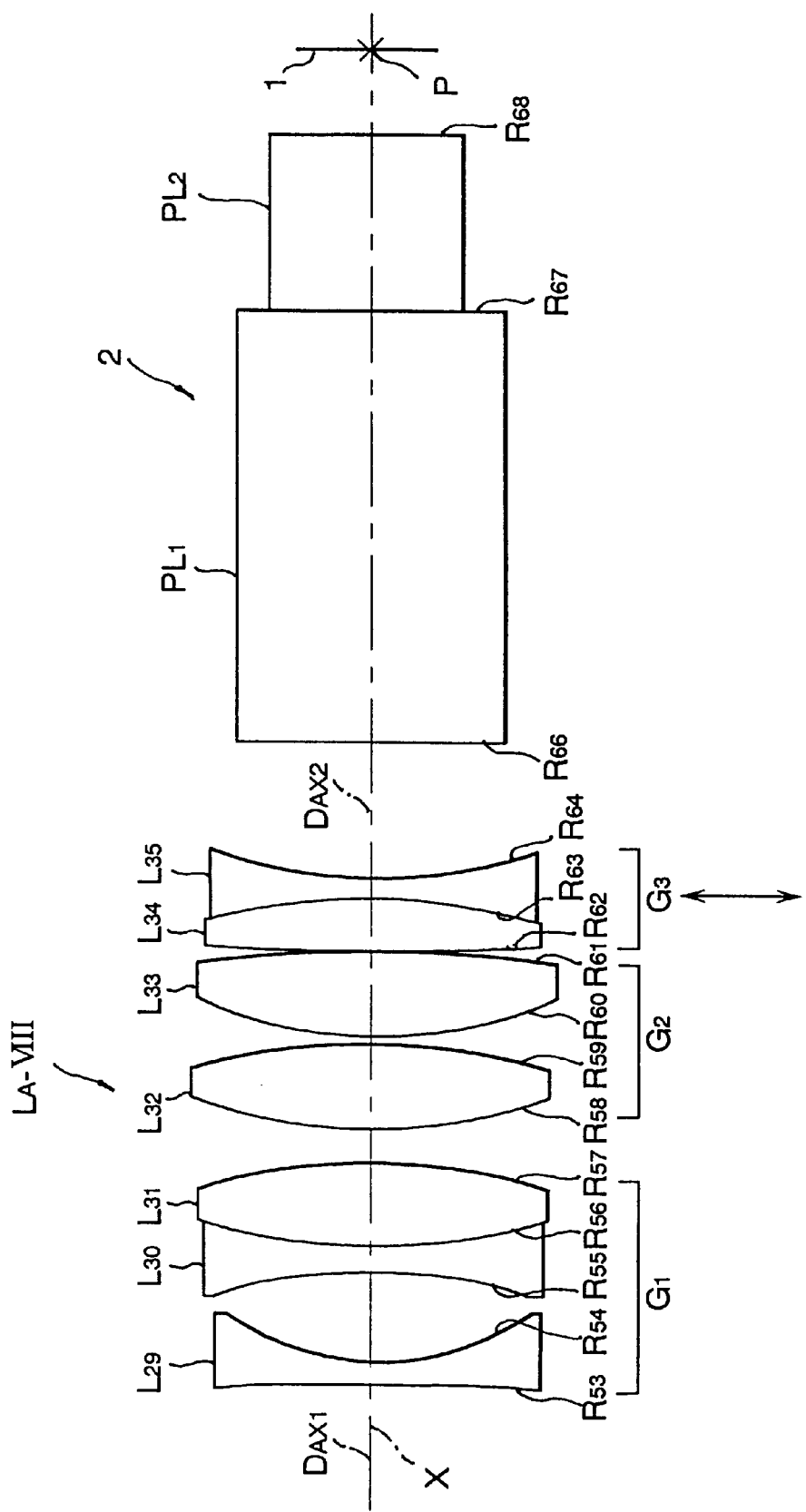
FIG. 9 is a schematic side view of an oscillation isolating attachment lens in accordance with a further embodiment of the invention.
Figures 12A, 12B, 12C, 12D:
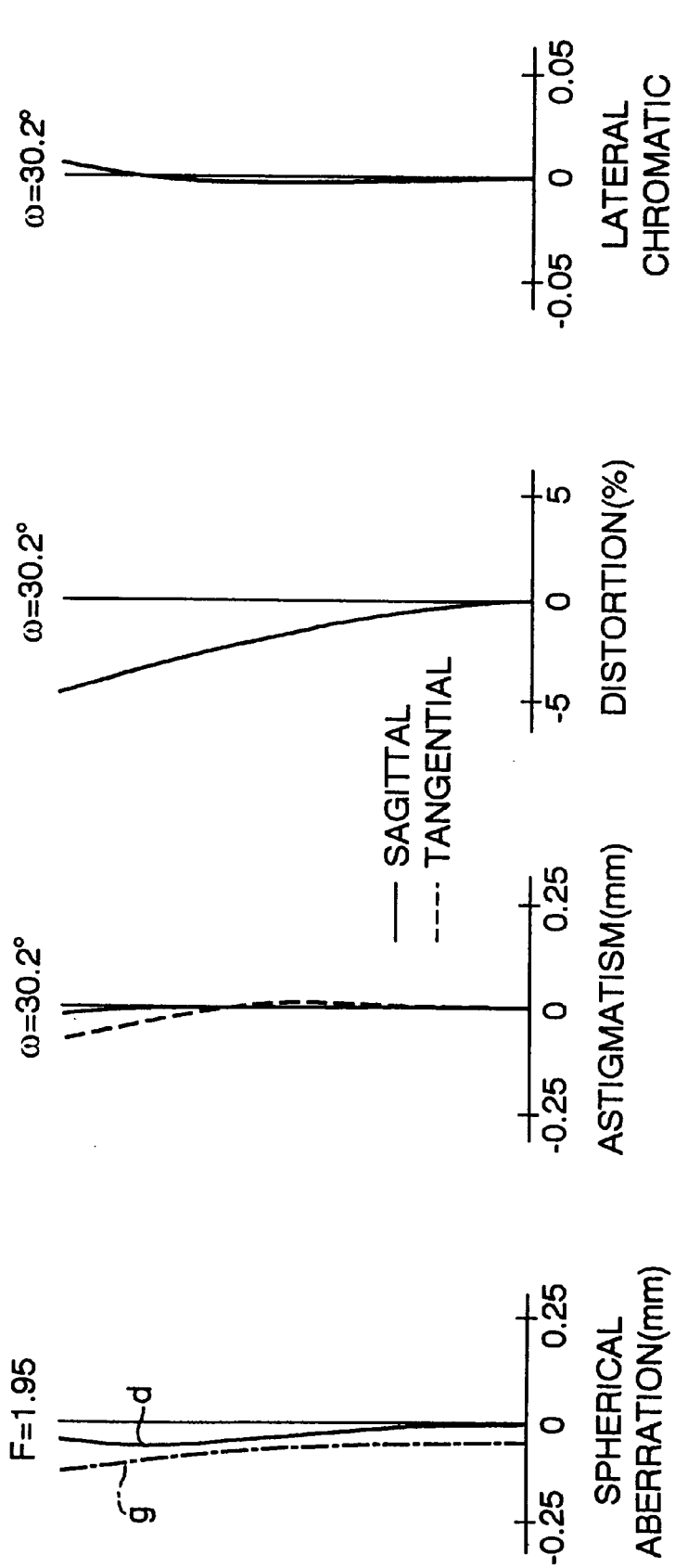
FIGS. 12A, 12B, 12C and 12D are diagrams showing spherical aberrations, astigmatism, distortion and lateral chromatic aberration, respectively, of the television camera lens including the oscillation isolating attachment lens of FIG. 3.
Figures 13A, 13B, 13C, 13D:
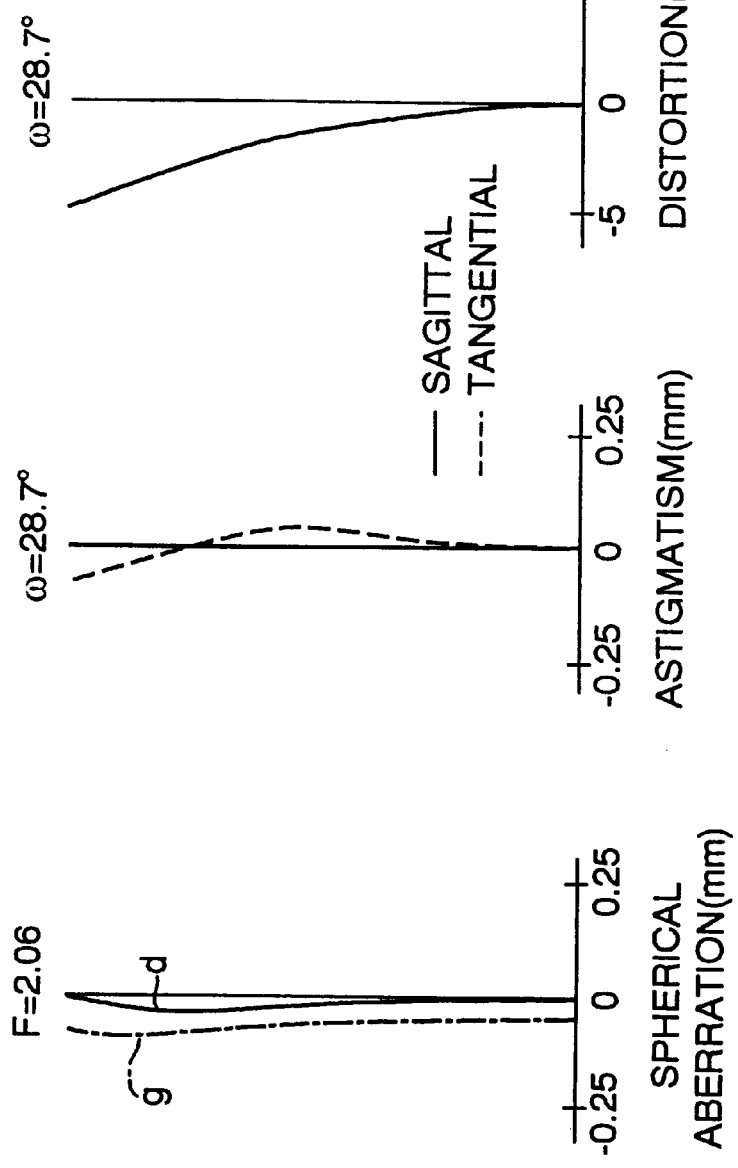

FIG. 9 shows an oscillation isolating attachment lens $L_A$-VIII according to an eighth embodiment of the invention. The oscillation isolating attachment lens $L_A$-VIII comprises a negative power first lens group $G_1$ comprising three lens elements $L_{29}$–$L_{31}$, a positive power second lens group $G_2$ comprising a single lens element $L_{32}$ and a positive power third lens group $G_3$ comprising three lens elements $L_{33}$–$L_{35}$, arranged in order from the object end. Specifically, the first lens group $G_1$ includes a negative power meniscus lens element $L_{29}$ having a concave image side surface and a cemented doublet consisting of a biconcave lens element $L_{30}$ having a strong curvature at an object side surface and a biconvex lens element $L_{31}$ having a strong curvature at an image side surface. The second lens group $G_2$ includes a single biconvex lens element $L_{32}$ having a strong curvature at an object side surface. The third lends group $G_3$ includes a biconvex lens element $L_{33}$ having a strong curvature at an image side surface and a cemented doublet consisting of a biconvex lens element $L_{34}$ having a strong curvature at an image side surface and a biconcave lens element $L_{35}$ having a strong curvature at an image side surface. The third lens group $G_3$ is capable of oscillating as one whole in a direction perpendicular to the optical axis X in response to a camera shake to cancel an oscillation of an image produced by the zoom lens $L_M$ due to the camera shake. The oscillation isolating attachment lens $L_A$ thus designed has a long back-focal distance and a long distance to the exit pupil, which is always desirable not only to provide a margin for laying out the color separation prism assembly 2 and filters between the oscillation isolating attachment lens $L_A$ and the image plane of the television camera but also to prevent an occurrence of color shading.

The oscillation isolating attachment lens $L_A$-VIII according to the eighth embodiment is substantially described in Table IX.

TABLE IX

| Element | Radius of Curvature (mm) | Axial Distance Between Surfaces (mm) | N | ν |
|---|---|---|---|---|
| $L_{29}$ | $R_{53}$ = 494.940 | 2.00 | 1.88299 | 40.9 |
|  | $R_{54}$ = 27.470 | 6.00 |  |  |
| $L_{30}$ | $R_{55}$ = −42.775 | 2.00 | 1.83400 | 42.7 |
|  | $R_{56}$ = 48.901 |  |  |  |
| $L_{31}$ |  | 6.50 | 1.84665 | 23.9 |
|  | $R_{57}$ = −53.846 | 2.81 |  |  |
|  | $R_{58}$ = 52.085 |  |  |  |
| $L_{32}$ |  | 6.30 | 1.48749 | 70.4 |
|  | $R_{59}$ = −75.254 | 0.80 |  |  |
|  | $R_{60}$ = 37.752 |  |  |  |
| $L_{33}$ |  | 6.30 | 1.56907 | 71.3 |
|  | $R_{61}$ = −124.370 | 0.20 |  |  |
|  | $R_{62}$ = 217.905 |  |  |  |
| $L_{34}$ |  | 3.70 | 1.48749 | 70.4 |
|  | $R_{63}$ = −104.284 |  |  |  |
| $L_{35}$ |  | 2.00 | 1.80517 | 25.4 |
|  | $R_{64}$ = 57.695 |  |  |  |

| Parameters | | | | | | |
|---|---|---|---|---|---|---|
| β | $|f_1/f_3|$ | $N_1$ | $N_2$ | $ν_2$ | $ν_3$ | $ν_{3bcc}$ |
| 1.238 | 0.485 | 1.88299 | 1.83400 | 42.7 | 23.9 | 25.4 |

As apparent from the Table IX, the oscillation isolating attachment lens $L_A$-VIII satisfies the conditions (1) through (6) set forth.

FIGS. 18A, 18B, 18C and 18D show respectively spherical aberrations for g- and d-lines, astigmatism on sagittal (S) and tangential (T) planes, distortion and lateral chromatic aberration of the oscillation isolating attachment lens $L_A$-VIII. As apparent, the oscillation isolating attachment lens $L_A$-VIII suitably balances the aberrations of the lens system.

Table X shows the axial distances $D_{AX1}$ and $D_{AX1}$ of the respective oscillation isolating attachment lenses according to the first to eighth embodiments.

TABLE X

|  | $L_A$-I | $L_A$-II | $L_A$-III | $L_A$-IV | $L_A$-V | $L_A$-VI | $L_A$-VII | $L_A$-VIII |
|---|---|---|---|---|---|---|---|---|
| $D_{AX1}$ | 4.04 | 5.04 | 4.04 | 4.04 | 3.54 | 3.54 | 4.04 | 4.04 |
| $D_{AX2}$ | 10.00 | 10.00 | 10.00 | 10.00 | 10.00 | 10.00 | 10.00 | 10.00 |

Other parameters of the main lens $L_M$ and the oscillation isolating attachment lens $L_A$ such as the overall focal length f', the back-focus length Bf', the axial position of exit pupil Dexp, F-number FNO and the Petzval sum Psum are shown in Table XI.

TABLE XI

|  | f' | Bf' | $D_{exp}$ | $F_{NO}$ | $P_{sum}$ |
|---|---|---|---|---|---|
| $L_M$ | 8.47 | 46.04 | 192 |  |  |
| $L_A$-I | 10.72 | 45.89 | 187 | 2.08 | 0.00112 |
| $L_A$-II | 10.01 | 45.94 | 111 | 1.95 | 0.00061 |
| $L_A$-III | 10.61 | 45.90 | 174 | 2.06 | 0.00123 |
| $L_A$-IV | 10.41 | 45.95 | 164 | 2.02 | 0.00139 |
| $L_A$-V | 10.62 | 45.96 | 146 | 2.06 | 0.00283 |
| $L_A$-VI | 10.61 | 45.96 | 148 | 2.08 | 0.00165 |
| $L_A$-VII | 10.63 | 45.98 | 154 | 2.07 | 0.00258 |
| $L_A$-VIII | 10.48 | 45.95 | 154 | 2.03 | 0.00196 |

The oscillation isolating attachment lens of the invention comprising three lens groups provides a sufficiently long back-focal distance and a sufficiently long distance to the exit pupil. In consequence, it is possible to arrange an optical system such as a color separation prism assembly and filters of a TV camera and a video camera with which the oscillation isolating attachment lens is used together with a high degree of freedom.

Further, the oscillation isolating attachment lens prevents an occurrence of color shading and is equipped with an oscillation isolating feature without being accompanied by aggravation of lens speed.

What is claimed is:

1. An attachment lens optical system disposed between a camera lens and an imaging device for extending an overall focal length of the camera lens, said attachment lens optical system comprising, in order from the object side, a lens group with a positive power including, in order from the object side, one of a biconcave lens element and a negative power meniscus lens element having a convex object side surface, a cemented doublet comprising a biconcave lens element and a biconvex lens element and at least one biconvex, and a lens group including at least one biconcave lens element, wherein at least one of said lens groups and said lens elements is movable in a direction perpendicular to an axis of said attachment lens optical system so as to cancel an image oscillation caused due to a shake of the imaging device.

2. The attachment lens optical system as defined in claim 1, wherein said attachment lens optical system satisfies the following condition:

$$1.1 \leq \beta < 1.3$$

where β is the magnification of the attachment lens optical system.

3. An attachment lens optical system disposed between a camera lens and an imaging device for extending an overall focal length of the camera lens, said attachment lens optical system comprising, in order from the object side, a negative power first lens group G1, a positive power second lens group G2 and the third lens group G3, wherein at least one of said first to third lens groups G1 to G3 is movable in a direction perpendicular to an axis of said attachment lens optical system so as to cancel an image oscillation caused due to a shake of the imaging device.

4. The attachment lens optical system as defined in claim 3, wherein said third lens group G3 has a negative power.

5. The attachment lens optical system as defined in claim 4, wherein said attachment lens optical system satisfies the following condition:

$$1.1 \leq \beta < 1.3$$

where β is the magnification of the attachment lens optical system.

6. The attachment lens optical system as defined claim 5, wherein said first lens group G1 includes, in order from the object side, a first lens element selected out of a biconcave lens element and a negative power meniscus lens element having a convex object side surface and a cemented doublet comprising a biconcave second lens element and a biconvex third lens element, said second lens group G2 includes at least one biconvex lens element, and said third lens group G3 includes at least one biconcave lens element.

7. The attachment lens optical system as defined in claim 6, wherein said attachment lens optical system satisfies the following condition:

$$0.1 \leq |f_1/f_3| \leq 0.7$$

where $f_1$ and $f_3$ are the focal lengths of said first lens element of said first lens group G1 and said third lens group G3, respectively.

8. The attachment lens optical system as defined in claim 6, wherein said attachment lens optical system satisfies the following conditions:

$$1.8 < N_1$$

$$1.8 < N_2$$

$$v_3 < v_2$$

$$v_{3bcc} < 30$$

where $N_1$ and $N_2$ are the indices of refraction of said first and second lens elements of said first lens group G1, respectively, and $v_2$, $v_3$ and $v_{3bcc}$ are the Abbe numbers of said second lens element of said first lens group G1, said third lens element of said first lens group G1 and said biconcave lens element of said third lens group G3, respectively.

9. The attachment lens optical system as defined claim 3, wherein said third lens group G3 has a positive power.

10. The attachment lens optical system as defined in claim 9, wherein said attachment lens optical system satisfies the following condition:

$$1.1 \leq \beta \leq 1.3$$

where β is the magnification of the attachment lens optical system.

11. The attachment lens optical system as defined in claim 10, wherein said first lens group G1 includes, in order from the object side, a first lens element selected out of a biconcave lens element and a negative power meniscus lens element having a convex object side surface and a cemented doublet comprising a biconcave second lens element and a biconvex third lens element, said second lens group G2 includes at least one biconvex lens element, and said third lens group G3 includes at least one biconcave lens element.

12. The attachment lens optical system as defined in claim 11, wherein said attachment lens optical system satisfies the following condition:

$$0.03 \leq |f_1/f_3| \leq 0.5$$

where $f_1$ and $f_3$ are the focal lengths of said first lens element of said first lens group G1 and said third lens group G3, respectively.

13. The attachment lens optical system as defined in claim 11, wherein said attachment lens optical system satisfies the following conditions:

$$1.8 < N_1$$
$$1.8 < N_2$$
$$v_3 < v_2$$
$$v_{3bcc} < 30$$

where $N_1$ and $N_2$ are the indices of refraction of said first and second lens elements of said first lens group G1, respectively, and $v_2$, $v_3$ and $v_{3bcc}$ are the Abbe numbers of said second lens element of said first lens group G1, said third lens element of said first lens group G1 and said biconcave lens element of said third lens group G3, respectively.

* * * * *